(12) United States Patent　　(10) Patent No.:　US 12,564,972 B1
Doak et al.　　(45) Date of Patent:　Mar. 3, 2026

(54) SLIDING GUIDE BLOCK FOR ROBOT END EFFECTOR

(71) Applicant: MSS, Inc., Nashville, TN (US)

(72) Inventors: Arthur G. Doak, Nashville, TN (US); Caleb H. Blackwell, Goodlettsville, TN (US)

(73) Assignee: MSS, LLC, Nashville, TN (US)

( * ) Notice:　Subject to any disclaimer, the term of this patent is extended or adjusted under 35 U.S.C. 154(b) by 1073 days.

(21) Appl. No.: 17/585,873

(22) Filed: Jan. 27, 2022

(51) Int. Cl.
　　*B25J 15/06*　　(2006.01)
　　*B25J 17/02*　　(2006.01)

(52) U.S. Cl.
　　CPC ....... B25J 15/0658 (2013.01); B25J 15/0683 (2013.01); *B25J 17/0266* (2013.01)

(58) Field of Classification Search
　　CPC . B25J 15/0658; B25J 15/0683; B25J 17/0266
　　See application file for complete search history.

(56)　　　　　References Cited

U.S. PATENT DOCUMENTS

| | | |
|---|---|---|
| 3,834,558 A | 9/1974 | Bru |
| 4,582,353 A | 4/1986 | Alvernhe |
| 4,768,919 A * | 9/1988 | Borgman ............... B65G 47/91 |
| | | 901/40 |
| 6,318,777 B1 | 11/2001 | Tanaka et al. |
| 7,261,350 B2 | 8/2007 | Isetani et al. |
| RE40,394 E | 6/2008 | Roos et al. |
| 8,332,336 B2 | 12/2012 | Valpola et al. |
| 9,050,719 B2 | 6/2015 | Valpola et al. |
| 9,230,329 B2 | 1/2016 | Lukka |

| | | |
|---|---|---|
| 9,713,875 B2 | 7/2017 | Lukka |
| 10,668,630 B2 | 6/2020 | Robinson et al. |
| 10,864,555 B2 | 12/2020 | Mccoy, Jr. et al. |
| 11,059,075 B2 | 7/2021 | Mccoy, Jr. et al. |
| 11,069,053 B2 | 7/2021 | Horowitz et al. |
| 11,136,223 B2 | 10/2021 | Sato et al. |

(Continued)

FOREIGN PATENT DOCUMENTS

| | | |
|---|---|---|
| CN | 104589351 A | 5/2015 |
| EP | 706838 A1 | 4/1996 |

(Continued)

OTHER PUBLICATIONS

Related co pending U.S. Appl. No. 17/585,876, filed Jan. 27, 2022 (not prior art).

*Primary Examiner* — Stephen A Vu

(74) *Attorney, Agent, or Firm* — Lucian Wayne Beavers; Patterson Intellectual Property Law, PC

(57)　　　　　ABSTRACT

A robotic end effector includes a mounting block, a shaft, an end effector, and a plurality of spring biased mounting fasteners. The shaft extends from the mounting block and has a longitudinal axis. The end effector is mounted on an end of the shaft for engaging an article to be grasped. The plurality of spring biased mounting fasteners may be configured to connect the mounting block to a movable mounting frame of a robot such that in the absence of a lateral deflecting force being applied to the end effector the mounting block is held resiliently against the movable mounting frame of the robot with the longitudinal axis in a first orientation, and further such that when a lateral deflecting force is applied to the end effector the end of the shaft can deflect laterally such that the longitudinal axis is skewed from the first orientation.

19 Claims, 21 Drawing Sheets

(56) References Cited

U.S. PATENT DOCUMENTS

| | | |
|---|---|---|
| 2005/0218677 A1 | 10/2005 | Ilich |
| 2007/0200377 A1 | 8/2007 | Nishio |
| 2010/0088259 A1 | 4/2010 | Valpola et al. |
| 2013/0151007 A1 | 6/2013 | Valpola et al. |
| 2013/0266205 A1 | 10/2013 | Valpola |
| 2013/0338826 A1 | 12/2013 | Lukka |
| 2014/0088765 A1 | 3/2014 | Valpola et al. |
| 2014/0236355 A1 | 8/2014 | Lukka |
| 2014/0290417 A1 | 10/2014 | Lukka |
| 2018/0036774 A1 | 2/2018 | Lukka et al. |
| 2019/0030571 A1 | 1/2019 | Horowitz et al. |
| 2019/0061174 A1 | 2/2019 | Robinson et al. |
| 2019/0084012 A1 | 3/2019 | Mccoy, Jr. et al. |
| 2019/0130560 A1 | 5/2019 | Horowitz et al. |
| 2019/0217342 A1 | 7/2019 | Parr et al. |
| 2020/0048015 A1 | 2/2020 | Martin et al. |
| 2020/0087118 A1 | 3/2020 | Sato et al. |
| 2020/0206782 A1 | 7/2020 | Vogelaar |
| 2020/0206783 A1 | 7/2020 | Hogervorst et al. |
| 2020/0338753 A1 | 10/2020 | Schultz et al. |
| 2021/0061588 A1 | 3/2021 | Lukka et al. |
| 2021/0179366 A1 | 6/2021 | Mccoy, Jr. et al. |
| 2021/0206586 A1 | 7/2021 | Douglas et al. |
| 2021/0206588 A1 | 7/2021 | Douglas et al. |
| 2021/0237260 A1 | 8/2021 | Holopainen et al. |
| 2021/0237262 A1 | 8/2021 | Holopainen et al. |
| 2021/0287357 A1 | 9/2021 | Horowitz et al. |
| 2021/0380375 A1 | 12/2021 | Sato et al. |

FOREIGN PATENT DOCUMENTS

| | | | |
|---|---|---|---|
| WO | 9819799 A1 | 5/1998 | |
| WO | 03061858 A1 | 7/2003 | |
| WO | 20190207200 A1 | 10/2019 | |
| WO | 20190207201 A1 | 10/2019 | |
| WO | 20190207202 A1 | 10/2019 | |
| WO | 20190207203 A1 | 10/2019 | |
| WO | 20190215384 A1 | 11/2019 | |
| WO | 2020082176 A1 | 4/2020 | |
| WO | 2021016707 A1 | 2/2021 | |

* cited by examiner

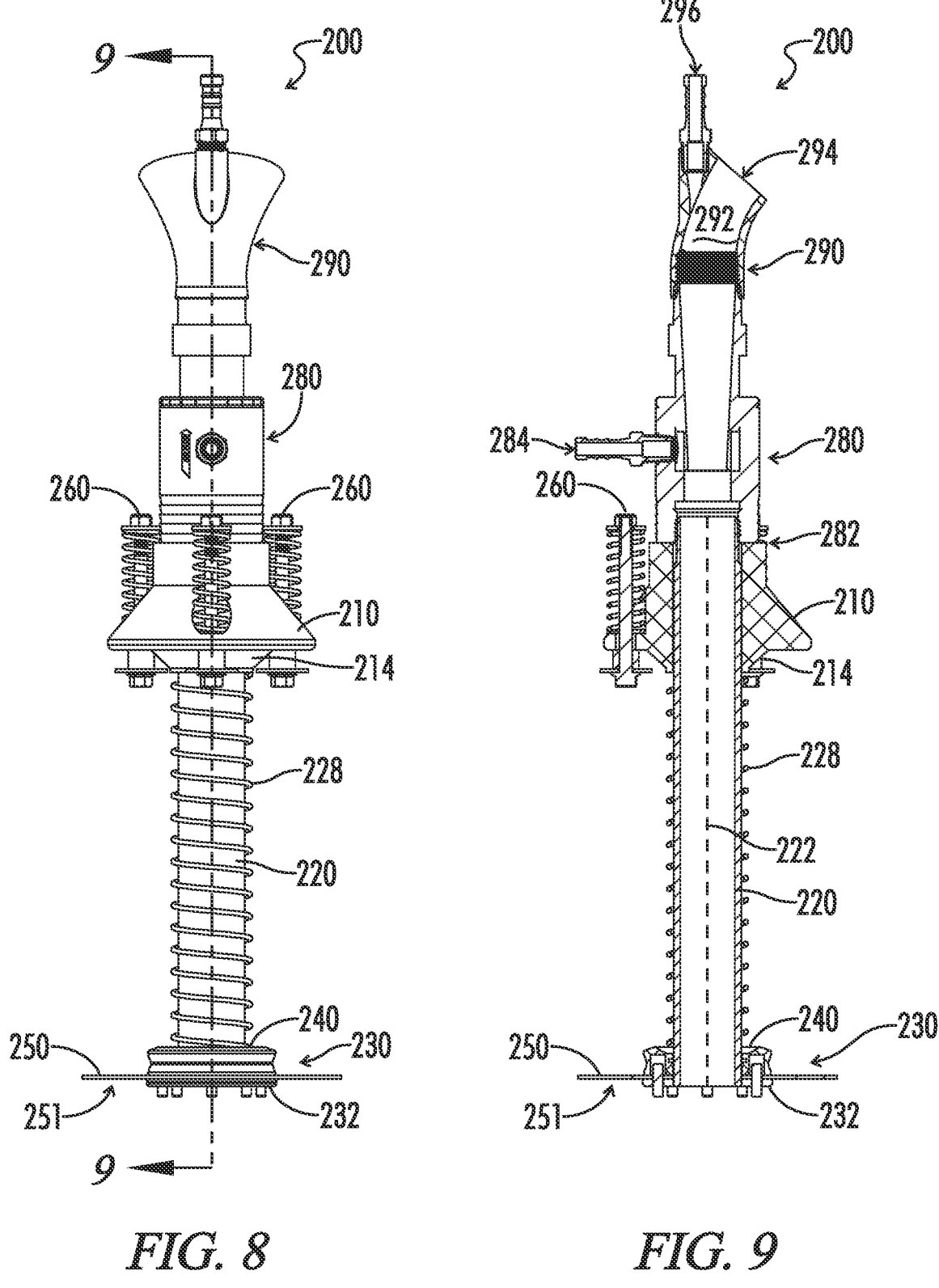
*FIG. 8*         *FIG. 9*

Figure 21:
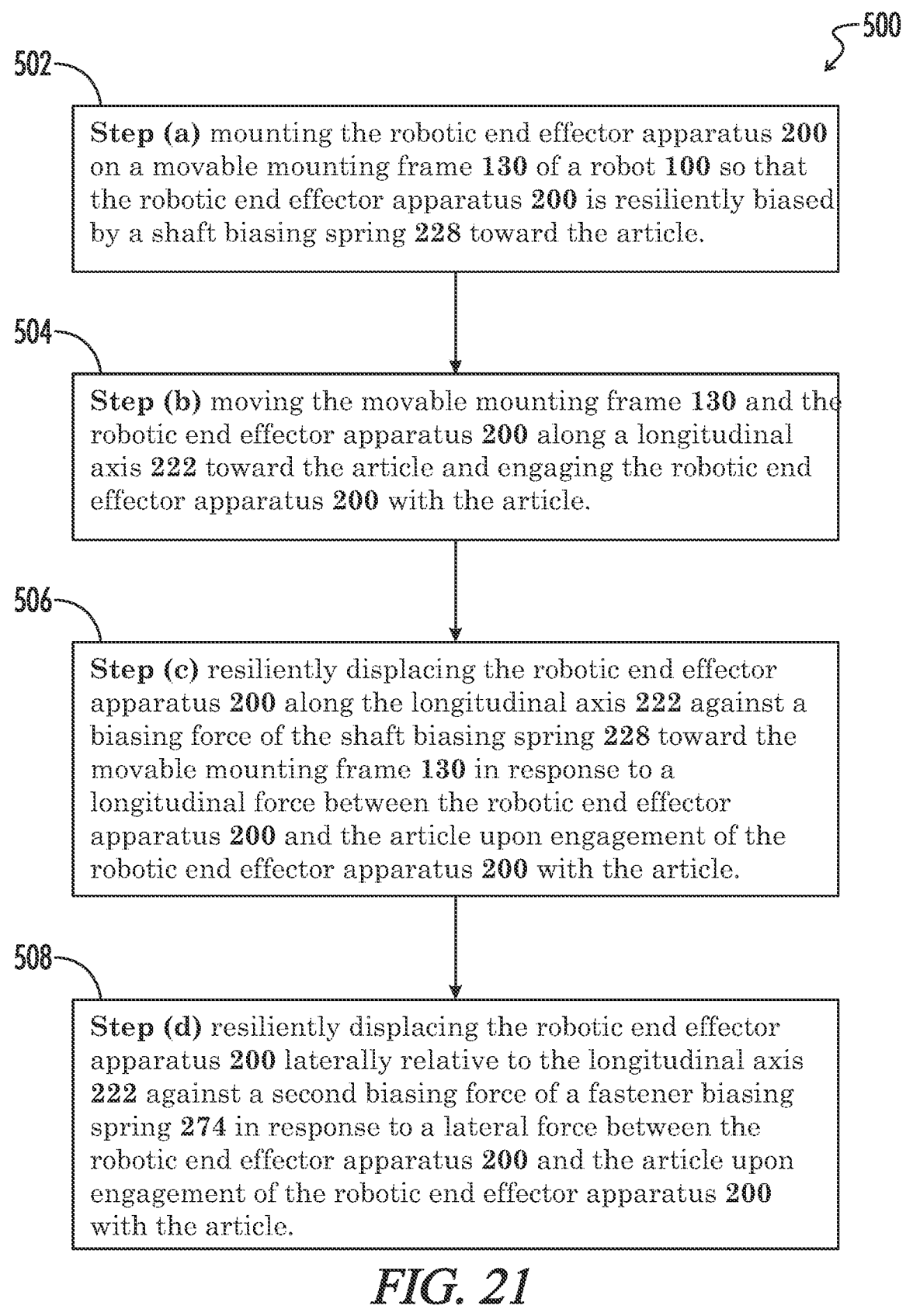

*500*

502 —

Step (a) mounting the robotic end effector apparatus 200 on a movable mounting frame 130 of a robot 100 so that the robotic end effector apparatus 200 is resiliently biased by a shaft biasing spring 228 toward the article.

504 —

Step (b) moving the movable mounting frame 130 and the robotic end effector apparatus 200 along a longitudinal axis 222 toward the article and engaging the robotic end effector apparatus 200 with the article.

506 —

Step (c) resiliently displacing the robotic end effector apparatus 200 along the longitudinal axis 222 against a biasing force of the shaft biasing spring 228 toward the movable mounting frame 130 in response to a longitudinal force between the robotic end effector apparatus 200 and the article upon engagement of the robotic end effector apparatus 200 with the article.

508 —

Step (d) resiliently displacing the robotic end effector apparatus 200 laterally relative to the longitudinal axis 222 against a second biasing force of a fastener biasing spring 274 in response to a lateral force between the robotic end effector apparatus 200 and the article upon engagement of the robotic end effector apparatus 200 with the article.

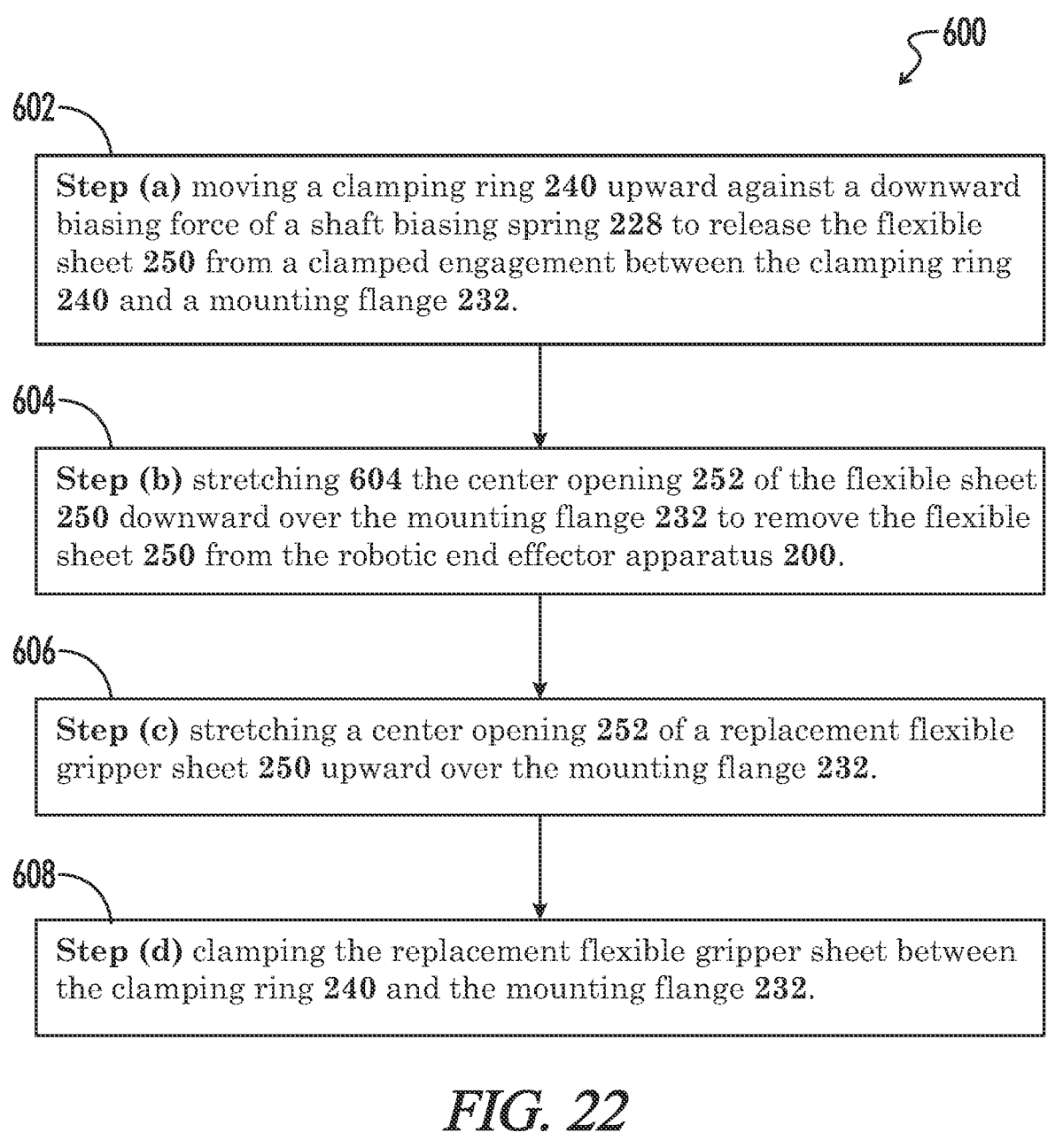

Step (a) moving a clamping ring 240 upward against a downward biasing force of a shaft biasing spring 228 to release the flexible sheet 250 from a clamped engagement between the clamping ring 240 and a mounting flange 232.

604 —

Step (b) stretching 604 the center opening 252 of the flexible sheet 250 downward over the mounting flange 232 to remove the flexible sheet 250 from the robotic end effector apparatus 200.

606 —

Step (c) stretching a center opening 252 of a replacement flexible gripper sheet 250 upward over the mounting flange 232.

608 —

Step (d) clamping the replacement flexible gripper sheet between the clamping ring 240 and the mounting flange 232.

*FIG. 22*

SLIDING GUIDE BLOCK FOR ROBOT END EFFECTOR

BACKGROUND OF THE INVENTION

1. Field of the Invention

The present invention relates generally to robotic suction grippers. More particularly, the present invention relates to waste sorting robotic suction grippers for sorting waste objects.

2. Description of the Prior Art

Suction grippers, which may also be referred to as robotic end effector apparatuses, are mechanisms used to pick up and move objects by applying a concentrated vacuum to a portion of an object's surface with sufficient vacuum strength to hold the object to the gripper. Suction grippers, however, face challenges operating in environments, such as recycling and consumer waste handling facilities, where the target object that needs to be captured may have random and irregular surfaces. The target object may also be referred to herein as a waste object.

In the context of a recycling center, these suction grippers may be carried by a delta robot 100, shown in FIGS. 1-4, which may generally be suspended over a conveyor belt carrying objects to be sorted. The delta robot 100 generally comprises a servo housing 110 and a plurality of arms 120 which are connected to one or more servos 112 for moving the plurality of arms 120. The plurality of arms 120 extend down from the servo housing 110 to a base which is coupled to a manipulator, such as, for example, a suction gripper. The arms are connected via universal joints at the base.

There are several problems associated with using a suction gripper and a delta robot 100 to engage the target object and move the target object into a sorting chute. One such problem may be caused by the delta robot applying too much vertical force to the target object when trying to engage it. The vertical force may at least partially be imparted to and cause damage to the suction gripper or to the robot. Another problem may be caused by the random and irregular surfaces or shape of the target object. The random and irregular surfaces or shape of the target object may cause a lateral force to at least partially be imparted to and cause damage to the suction gripper or to the robot.

SUMMARY OF THE INVENTION

In view of at least some of the above-referenced problems in conventional suction grippers, an exemplary object of the present disclosure may be to provide a new and improved robotic end effector apparatus that is operatively configured to deflect from a first, generally vertical, orientation in order to compensate for any lateral forces applied thereto, either by the delta robot or the random and irregular surfaces or shape of the target object. An exemplary such apparatus may desirably compensate for vertical forces by providing, at least partially, vertical movement compensation.

In a particular embodiment, an exemplary robotic end effector apparatus for grasping an article may include a mounting block, a shaft, an end effector, and a plurality of spring biased mounting fasteners. The shaft may extend from the mounting block and include a longitudinal axis. The end effector may be mounted on a lower end of the shaft for engaging an article to be grasped. The plurality of spring biased mounting fasteners may be configured to connect the mounting block to a movable mounting frame of a robot such that in the absence of a lateral deflecting force being applied to the end effector the mounting block is held resiliently against the movable mounting frame of the robot and the longitudinal axis is held in a first orientation, and further such that when a lateral deflecting force is applied to the end effector the lower end of the shaft can deflect laterally such that the longitudinal axis is skewed from the first orientation.

In an exemplary aspect according to the above-referenced embodiment, the plurality of spring biased mounting fasteners may include three spring biased mounting fasteners arranged substantially equidistant around the longitudinal axis.

In another exemplary aspect according to the above-referenced embodiment, each of the plurality of spring biased mounting fasteners may include an elongated fastener shaft, a first stop attached to one end of the fastener shaft and configured to engage the movable mounting frame of the robot, a second stop attached to a second end of the fastener shaft, and a fastener biasing spring configured to be disposed between the second stop and the mounting block to bias the mounting block against the movable mounting frame of the robot.

In another exemplary aspect according to the above-referenced embodiment, the mounting block may have a plurality of cylindrical recesses formed therein for receiving ends of the fastener biasing springs.

In another exemplary aspect according to the above-referenced embodiment, the plurality of spring biased mounting fasteners may be configured to permit a skew angle of the shaft up to at least 10 degrees. In an embodiment the skew angle may be up to at least 15 degrees.

In another exemplary aspect according to the above-referenced embodiment, the mounting block may include a conically tapered centering projection surrounding the shaft and extending toward the end effector.

In another exemplary aspect according to the above-referenced embodiment, for example when the apparatus is in combination with the movable mounting frame of the robot, the movable mounting frame of the robot may include a conically tapered centering receptacle. In accordance with this aspect, the conically tapered centering projection may be received in the conically tapered centering receptacle to define the first orientation of the longitudinal axis when the mounting block is held resiliently against the movable mounting frame of the robot by the plurality of spring biased mounting fasteners.

In another exemplary aspect according to the above-referenced embodiment, the shaft may be slidably received in the mounting block so that upon impacting an article with the end effector the end effector and the shaft can move along the longitudinal axis toward the mounting block.

In another exemplary aspect according to the above-referenced embodiment, the apparatus may further include a shaft biasing spring disposed between the mounting block and the end effector for biasing the shaft and the end effector away from the mounting block.

In another exemplary aspect according to the above-referenced embodiment, the shaft may be a tubular shaft configured to communicate a suction to the end effector.

In another exemplary aspect according to the above-referenced embodiment, the apparatus may further include a vacuum pump mounted on the tubular shaft on a portion of the tubular shaft on an opposite side of the mounting block from the end effector.

In another exemplary aspect according to the above-referenced embodiment, the tubular shaft may be slidably received in the mounting block so that upon impacting an article with the end effector the end effector and the tubular shaft can move along the longitudinal axis toward the mounting block. In accordance with this aspect, the apparatus may further include a shaft biasing spring disposed between the mounting block and the end effector for biasing the tubular shaft and the end effector away from the mounting block. Further in accordance with this aspect, the vacuum pump may rest on the mounting block to define a fully extended position of the tubular shaft and the end effector away from the mounting block In another exemplary aspect according to the above-referenced embodiment, the apparatus may further include an exhaust manifold mounted on the vacuum pump and having an exhaust inlet passage communicated with the vacuum pump and oriented concentric with the longitudinal axis of the tubular shaft. In accordance with this aspect, the exhaust manifold may further include a flared exhaust outlet projecting away from the vacuum pump and laterally away from the longitudinal axis.

In another exemplary aspect according to the above-referenced embodiment, the exhaust manifold may further include a reversing air passage oriented substantially parallel to the longitudinal axis for directing a jet of reversing air into the exhaust manifold in a direction opposite to a direction of flow of a suction air stream from the vacuum pump.

In another embodiment, a method of engaging a robotic end effector with an article to be picked by the end effector is disclosed. The method may comprise (a) mounting the end effector on a movable mounting frame of a robot so that the end effector is resiliently biased toward the article; (b) moving the movable mounting frame and the end effector along a longitudinal axis toward the article and engaging the end effector with the article; (c) resiliently displacing the end effector along the longitudinal axis toward the movable mounting frame in response to a longitudinal force between the end effector and the article upon engagement of the end effector with the article; and (d) resiliently displacing the end effector laterally relative to the longitudinal axis in response to a lateral force between the end effector and the article upon engagement of the end effector with the article.

Numerous objects, features and advantages of the present invention will be readily apparent to those skilled in the art upon reading of the following disclosure when taken in conjunction with the accompanying drawings.

BRIEF DESCRIPTION OF THE DRAWINGS

FIG. 8 is an elevation view of the end effector apparatus. The movable mounting frame of the robot has been removed for ease of illustration.

FIG. 9 is a sectioned elevation view of the end effector apparatus taken along line 9-9 of FIG. 8.

FIG. 21 is a flow diagram of a method of engaging a robotic end effector apparatus with an article to be picked up by the robotic end effector apparatus.

FIG. 22 is a flow diagram of a method of replacing a flexible sheet of a robotic end effector apparatus for grasping an article using suction.

DETAILED DESCRIPTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 23:
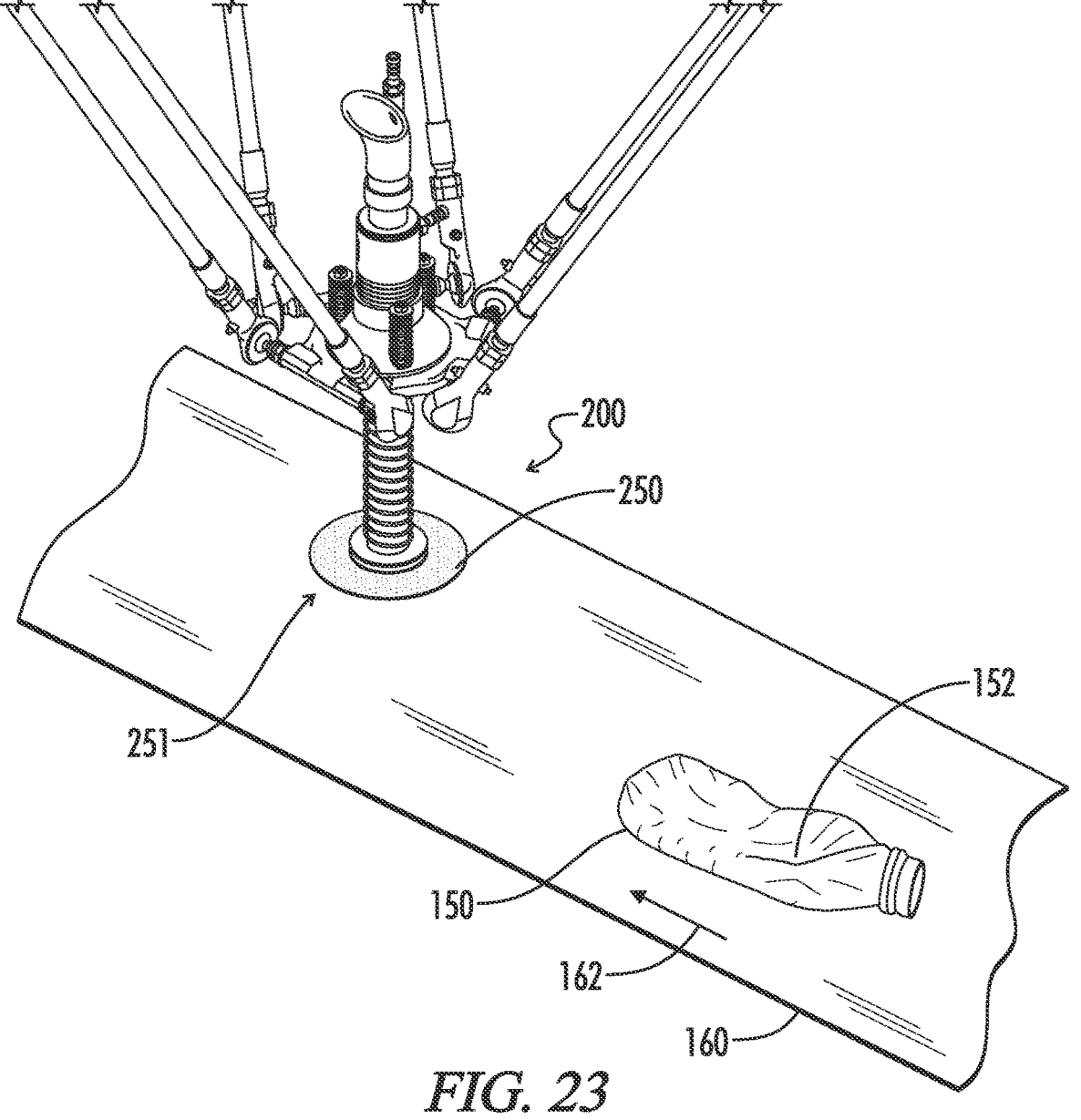
FIG. 23 is a schematic perspective view showing the robot holding the end effector apparatus over a conveyor belt carrying articles to be sorted.
Figure 24:
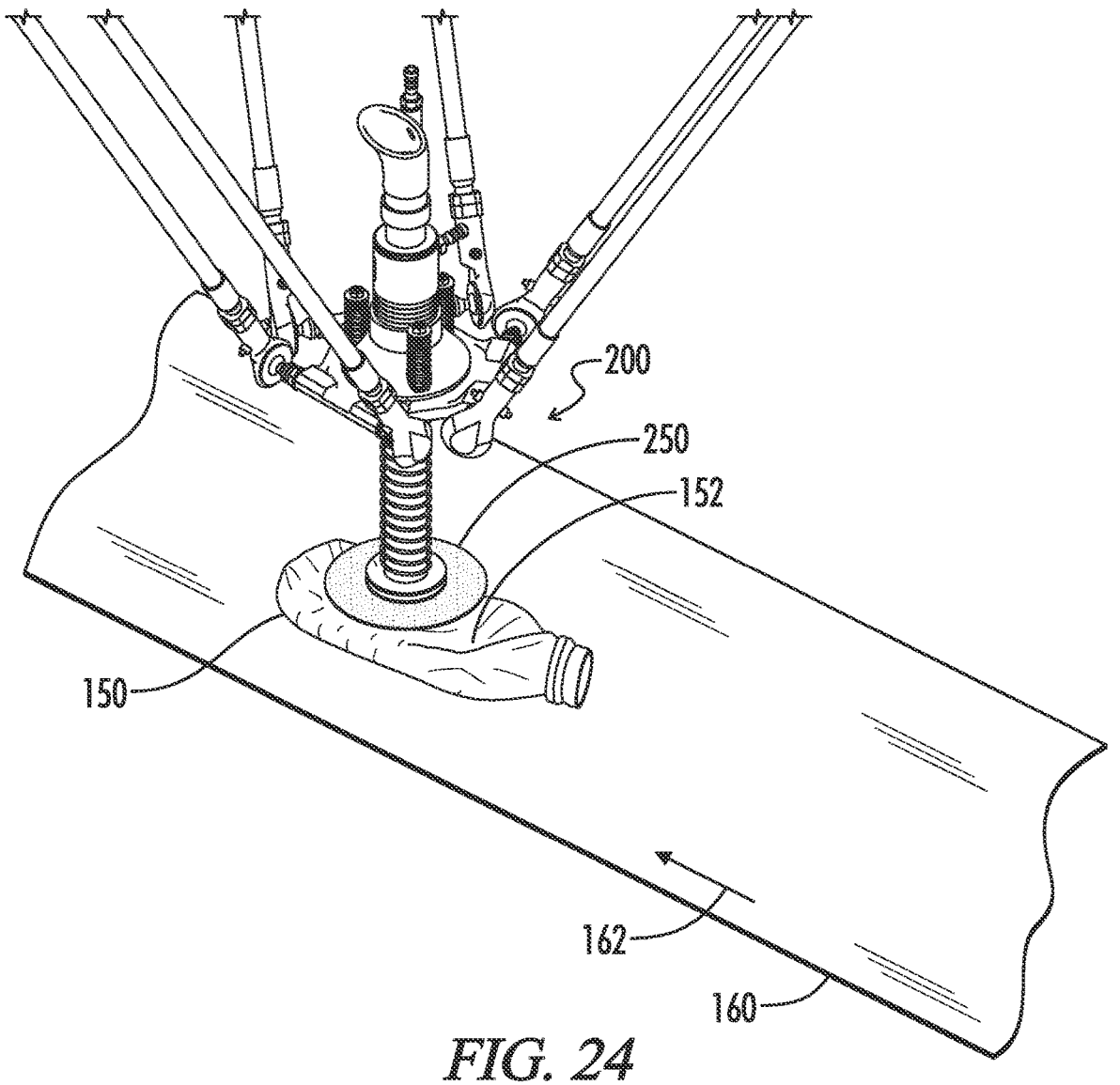
FIG. 24 is a schematic perspective view similar to FIG. 23 showing the robotic end effector positioned over an article to be picked up.
Figure 25:
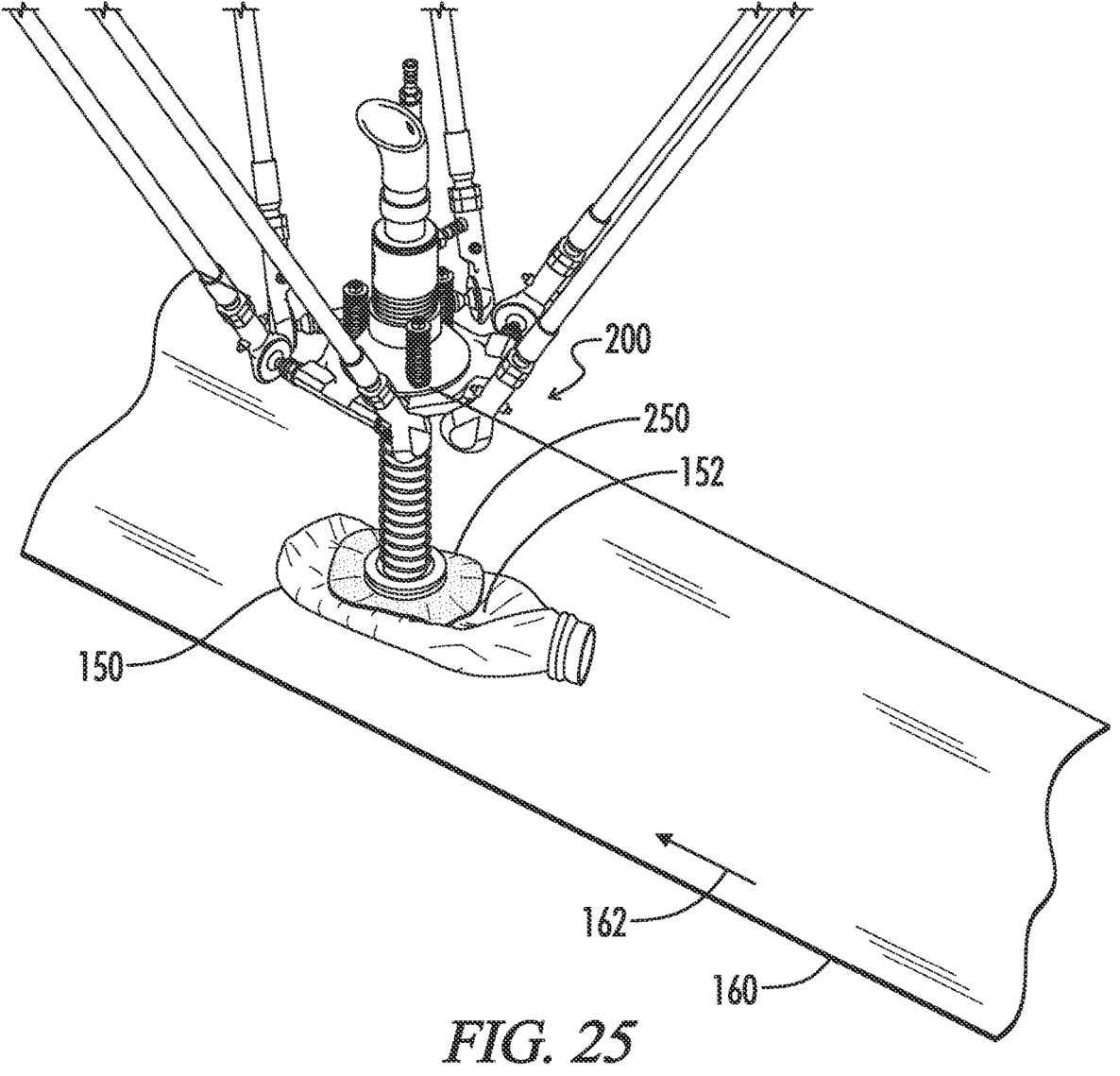
FIG. 25 is a schematic perspective view similar to FIG. 23 showing the robotic end effector gripping the article.

Referring to FIGS. 1-4, a robotic end effector apparatus 200 is shown in combination with the delta robot 100. The delta robot 100 may also be referred to herein as a robot 100. The robotic end effector apparatus 200, while illustrated in combination with the delta robot 100, may be utilized with other types of robots. As seen in FIGS. 23-25 the robotic end effector apparatus 200 may be configured to grasp an article 150 which is moving in direction 162 along a conveyor 160, for example, using a suction effect. The article 150 may, for example, be a waste object to be sorted in a recycling and consumer waste handling facility having a deformation 152 (e.g., random and irregular surfaces or shape). In other optional embodiments, the article 150 may be any item in an industry for which the robotic end effector apparatus 200 may be useful for grabbing, sorting, or the like. The robotic end effector apparatus 200 may also be referred to herein as a robotic end effector 200.

Referring to FIGS. 5-6 and 8-10, detailed views of the robotic end effector apparatus 200 are shown. The robotic end effector apparatus 200 may comprise a mounting block 210, a shaft 220, an end effector 230, and a plurality of spring biased mounting fasteners 260. The shaft 220 may extend from the mounting block 210 and may further include a longitudinal axis 222. The shaft 220 may be tubular and may be configured to communicate a suction 206 to the end effector 230. Accordingly, the shaft 220 may also be referred to herein as a suction tube 220. The end effector 230 may be mounted on a lower end 224 of the shaft 220 and may be configured to engage an article 150 to be grasped. The lower end 224 of the shaft 220 may also be referred to herein as an open lower end 224. The plurality of spring biased mounting fasteners 260 may be configured to connect the mounting block 210 to a movable mounting frame 130 of the robot 100. As illustrated in FIG. 7, the movable mounting frame 130 may include a plurality of universal joints 132 configured to couple to the plurality of arms 120 of the robot 100.

Figure 1:
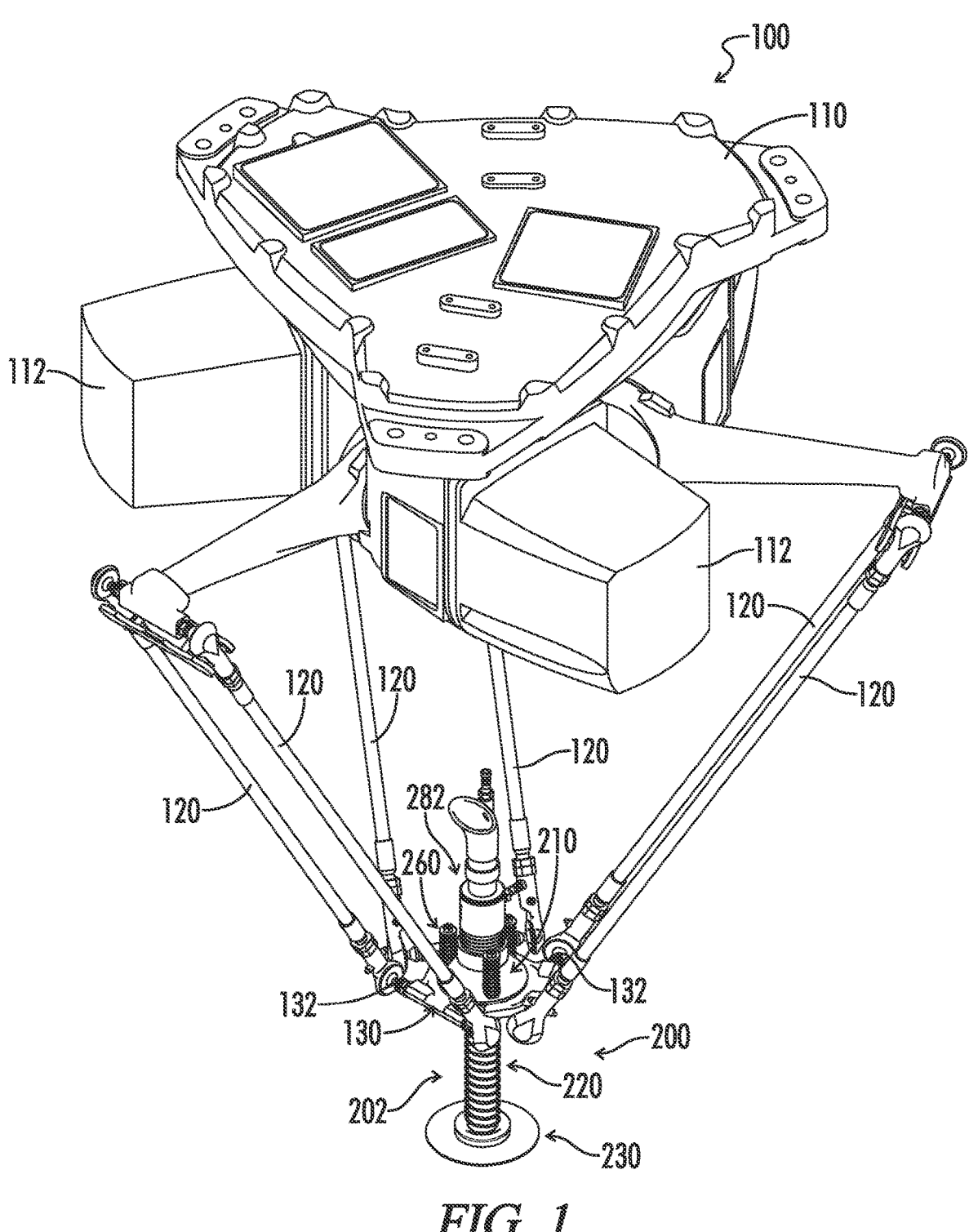
FIG. 1 is a schematic perspective view of a robotic sorting system.
Figure 2:
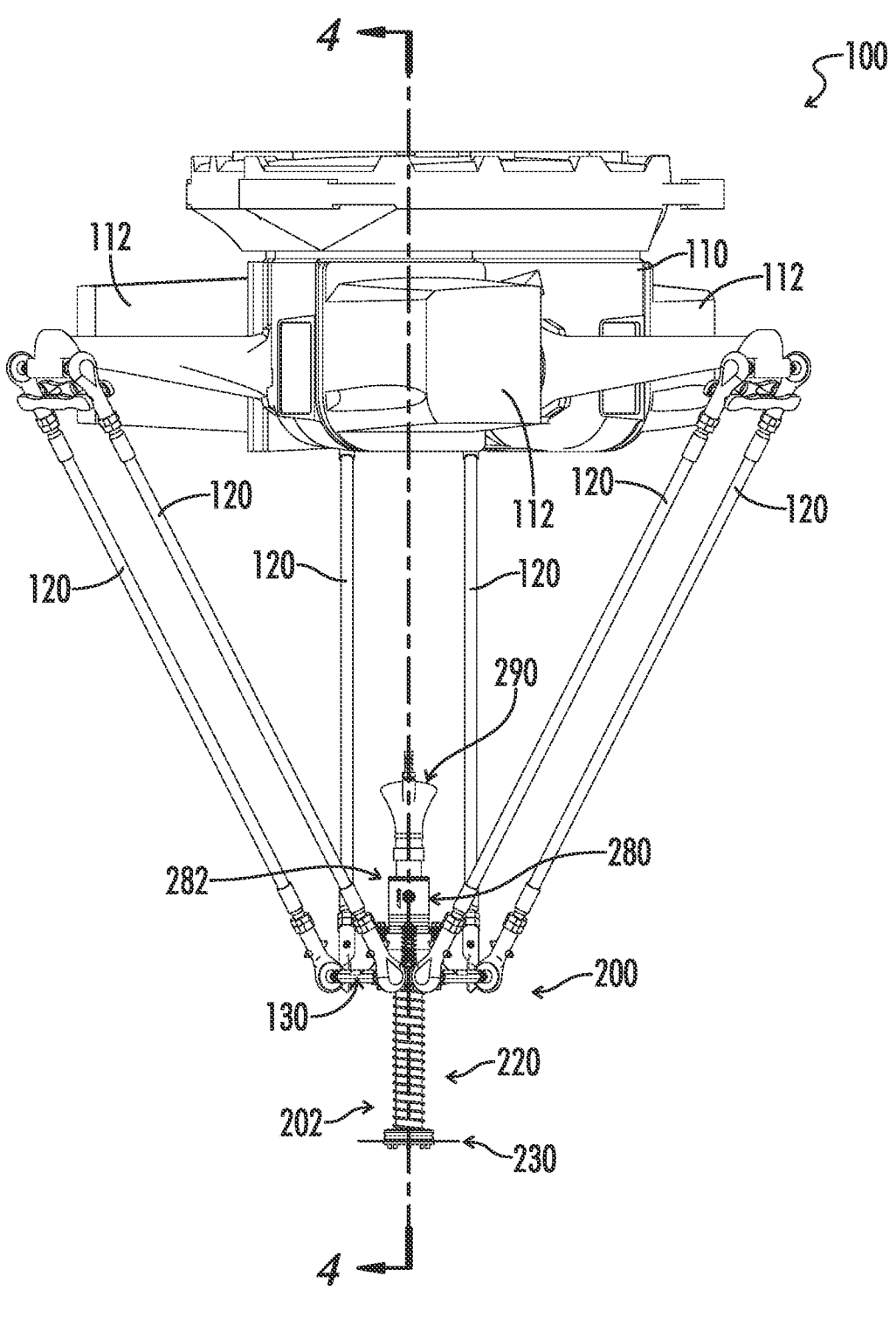
FIG. 2 is an elevation view of a robot having an end effector apparatus of the present disclosure mounted thereon. A suction tube of the end effector apparatus is shown biased to a downwardmost position relative to a movable mounting frame of the robot.
Figure 3:
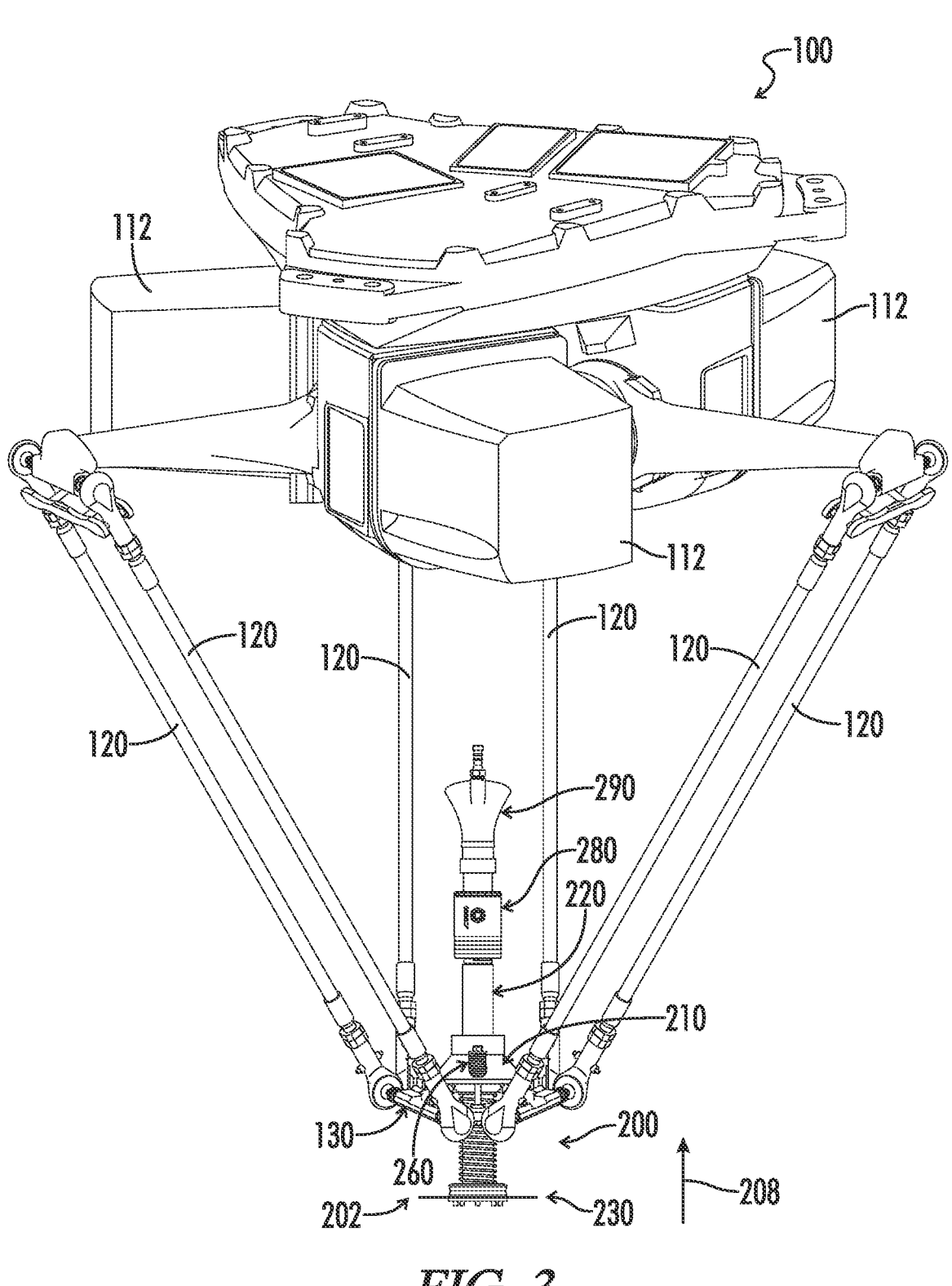
FIG. 3 is a view similar to FIG. 2 but showing the end effector apparatus deflected upwardly relative to the movable mounting frame of the robot.

The plurality of spring biased mounting fasteners 260 may be configured such that in the absence of a lateral deflecting force being applied to the end effector 230 the mounting block 210 is held resiliently against the movable mounting frame 130 of the robot 100 and the longitudinal axis 222 is held in a first orientation 202, shown in FIGS. 1-3. The plurality of spring biased mounting fasteners 260 may further be configured such that when a lateral deflecting force 204 (shown in FIG. 4) is applied to the end effector 230 the lower end 224 of the shaft 220 can deflect laterally such that the longitudinal axis 222 is skewed from the first orientation 202.

As illustrated in FIG. 8, the plurality of spring biased mounting fasteners 260 may include three spring biased mounting fasteners arranged substantially equidistant around the longitudinal axis 222. The spring biased mounting fasteners 260 may be equally spaced at angles of 120 degrees about the longitudinal axis 222 and may be located radially outward from longitudinal axis 222 by equal radial distances. But the angular spacing and radial spacing need not be equal for each of the three spring biased mounting fasteners 260. More than three spring biased mounting fasteners 260 may be used.

Each of the plurality of spring biased mounting fasteners 260 may include an elongated fastener shaft 262 having a first end 264 and a second end 266, a first stop 270 attached to the first end 264 of the fastener shaft 262, a second stop 272 attached to the second end 266 of the fastener shaft 262, and a fastener biasing spring 274. The first stop 270 may be a bolt head and may be configured to engage the movable mounting frame 130 of the robot 100. The second stop 272 may be a nut. The fastener biasing spring 274 may be configured to be disposed between the second stop 272 and the mounting block 210 to bias the mounting block 210 against the movable mounting frame 130 of the robot 100.

Figure 4:
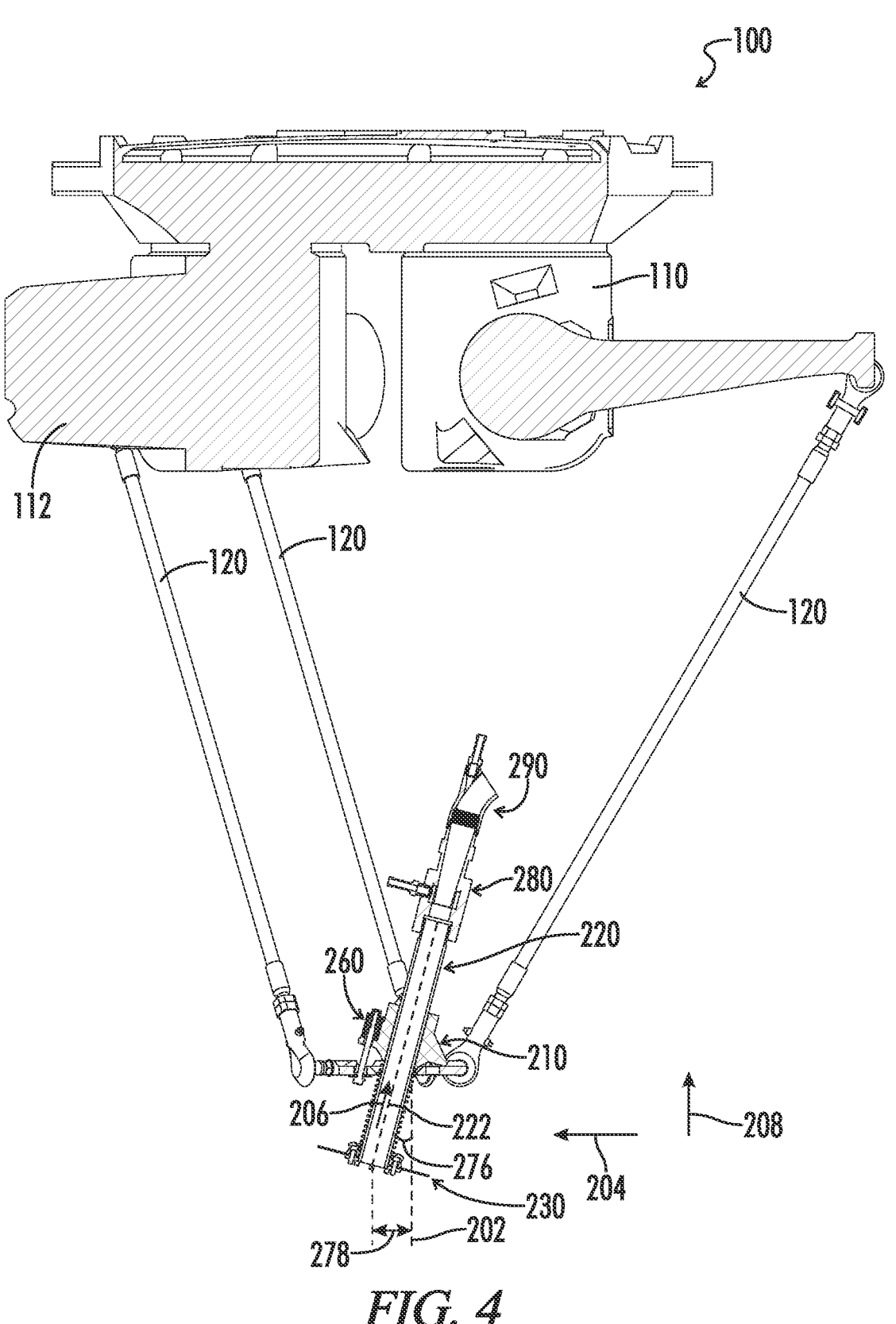
FIG. 4 is a cross-section view along line 4-4 of FIG. 3 showing a skewed lateral deflection of the end effector apparatus in addition to an upward deflection.
Figure 5:
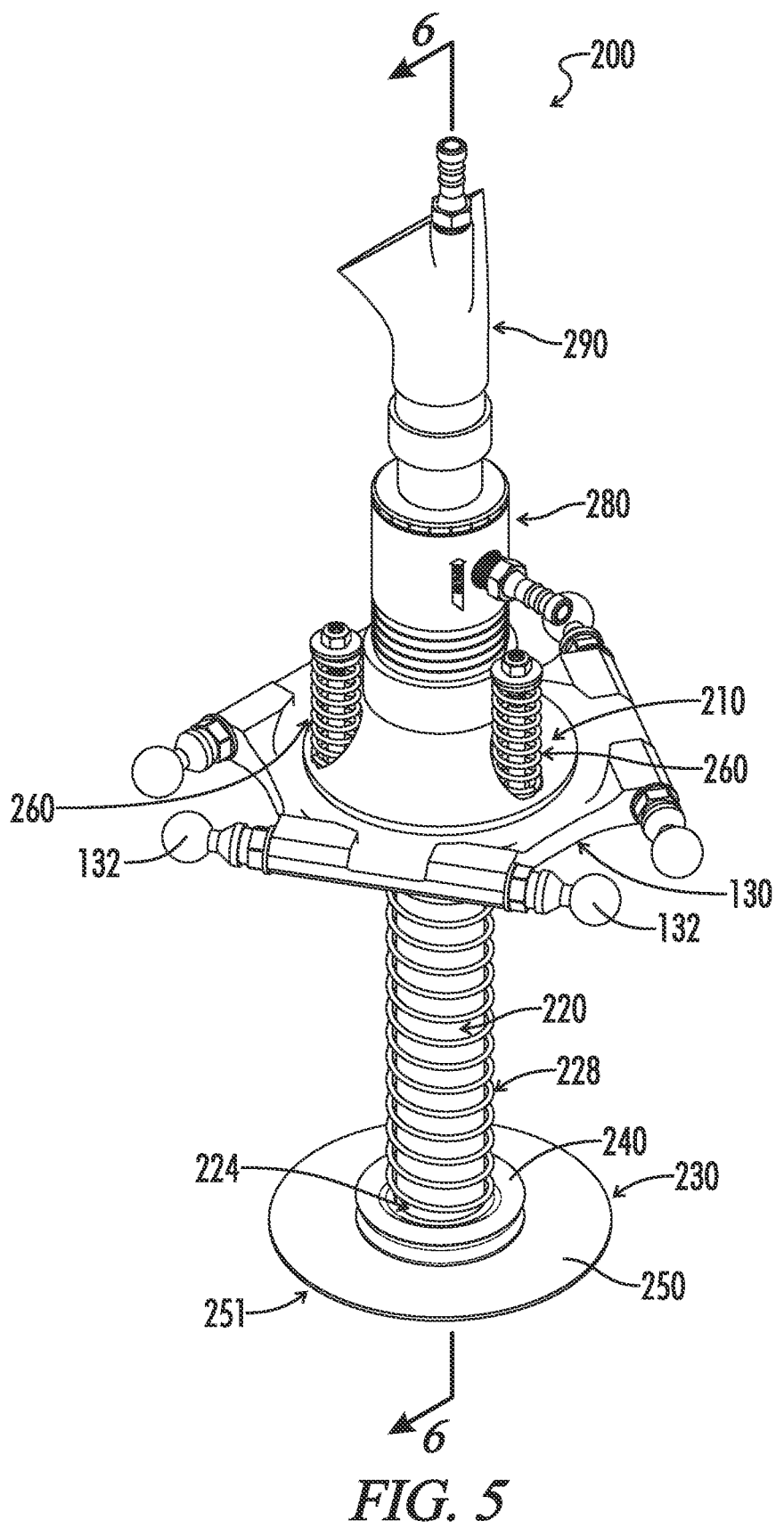
FIG. 5 is a perspective view of the end effector apparatus mounted on the movable mounting frame of the robot. The other elements of the robot have been removed for ease of illustration.

As illustrated in FIG. 4, the plurality of spring biased mounting fasteners 260 may be configured to permit a skew angle 276 of the shaft 220 up to at least ten degrees. In other optional embodiments, the skew angle 276 may be larger or smaller than ten degrees. In another embodiment the skew angle 276 may be at least fifteen degrees. In another embodiment the skew angle 276 may be at least twenty degrees. The skew angle 276 enables a lateral deviation 278 of the lower end 224 of the shaft 220 from the first orientation 202 (illustrated by the dashed line in FIG. 4). The lateral deviation 278 may also be referred to herein as an offset distance 278. The lateral deviation 278 may depend at least in part on a lower portion length of the shaft 220 extending below the movable mounting frame 130 of the robot 100 and the skew angle 276.

The plurality of spring biased mounting fasteners 260 may enable the robotic end effector apparatus 200 to avoid damage to itself, and to the robot 100, which might occur when attempting to grasp an article 150 having a random and irregular surfaces or shape that would otherwise apply, a potentially substantial, lateral force to the lower end 224 of the shaft 220, for example, if it were not movable. Furthermore, by enabling the skew angle 276, the plurality of spring biased mounting fasteners 260 may enable the lower end 224 of the shaft 220 to maintain contact and grip of an article 150 having a random and irregular surfaces or shape.

Certain aspects of the present disclosure, such as the slidable mounting of the shaft 220 within the mounting block 210 which allows vertical displacement of the end effector on impact, and the spring biased mounting of the mounting block 210 to the movable mounting frame 130 which allows lateral displacement of the end effector on impact, may be used with the flexible sheet type of end effector described below or with other types of end effectors. For example, these features could be used with a vacuum cup type of end effector instead of the flexible sheet end effector disclosed herein. But these features are especially useful with a flexible sheet type end effector which unlike a vacuum cup does not have vertical and lateral flexibility built into the structure of the end effector.

As illustrated in FIGS. 10-14, the mounting block 210 may include a plurality of cylindrical recesses 212 formed therein for receiving lower ends of the fastener biasing springs 274. The cylindrical recesses 212 may help stabilize and orient the fastener biasing springs 274.

The mounting block 210 may further include a tapered centering projection 214 extending toward the end effector 230. In the embodiment illustrated the tapered centering projection is a frusto-conically shaped tapered centering projection surrounding the shaft 220. But the tapered centering projection need not be conical. It could be a series of tapered ribs, or pyramidal shaped, or any other suitable tapered shape. The movable mounting frame 130 of the robot 100 may be modified to include a tapered centering receptacle 134. The tapered centering projection 214 of the mounting block 210 may be configured to be received in the tapered centering receptable 134 to define the first orientation 202 of the longitudinal axis 222 when the mounting block 210 is held resiliently against the movable mounting frame 130 of the robot 100 by the plurality of spring biased mounting fasteners 260. The tapered centering receptacle 134 may be frusto-conically shaped and complementary to the frusto-conically shapted tapered centering projection 214. But the tapered centering receptacle need not be conical and it may have any suitable tapered shape to receive the tapered centering projection.

The shaft 220 may be slidably received in a bore 211 of the mounting block 210 so that upon impacting an article 150 with the end effector 230, the end effector 230 and shaft 220 can move along the longitudinal axis 222 toward the mounting block 210.

The robotic end effector apparatus 200 may further include a shaft biasing spring 228 disposed between the mounting block 210 and the end effector 230. The shaft biasing spring 228 may surround be disposed around the shaft 220. The shaft biasing spring 228 may be configured to bias the shaft 220 and the end effector 230 away from the mounting block 210.

The robotic end effector apparatus 200 may further include a vacuum pump 280 mounted on a portion 226 of the shaft 220 on an opposite side of the mounting block 210 from the end effector 230. The vacuum pump 280 may be designed to operate on a Coanda effect and/or a venturi effect. A stream of pressurized air is directed to an air inlet passage 284. Internally within the vacuum pump 280 the pressurized air flow is directed upwardly to entrain air flowing upward through the vacuum tube 220 thus creating the suction effect 206 within the vacuum tube 220.

Figure 6:
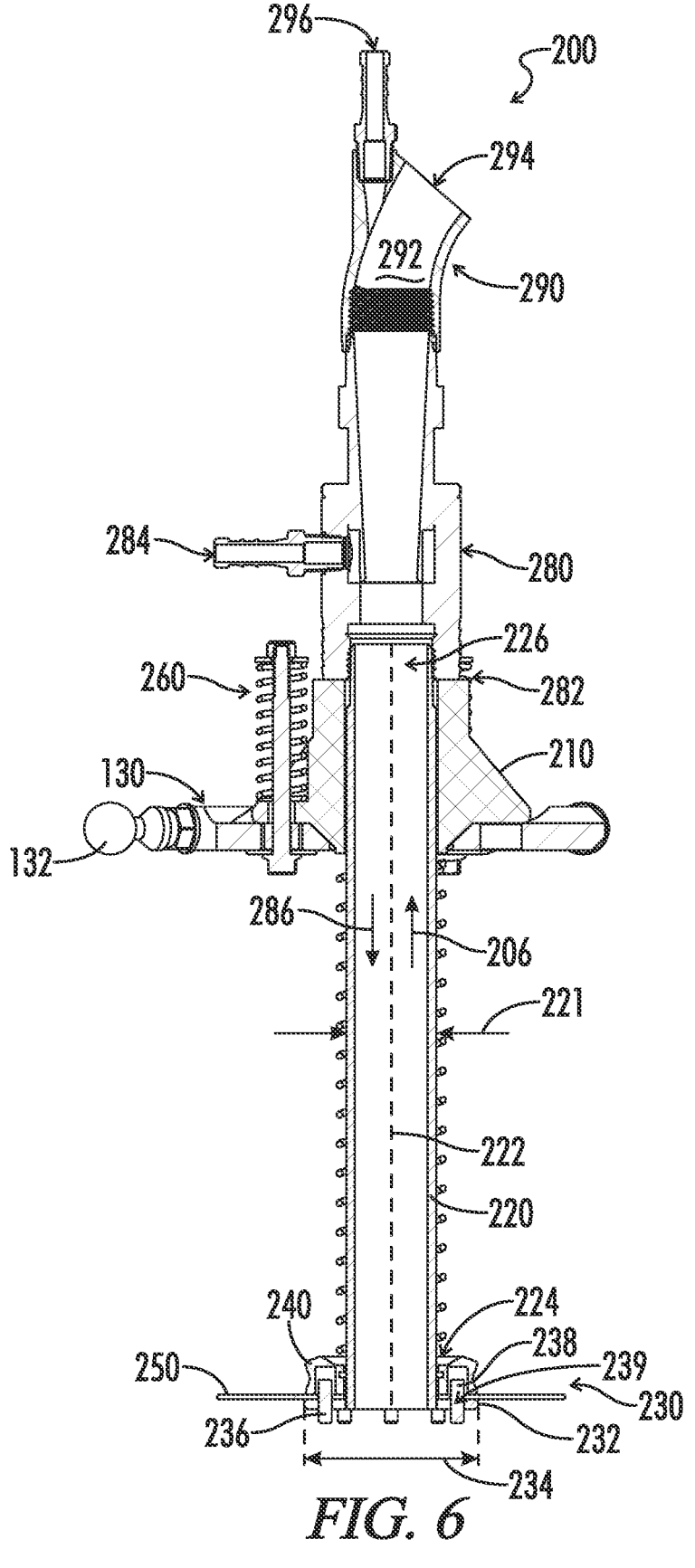
FIG. 6 is an elevation section view of the end effector apparatus mounted on the movable mounting frame of the robot of FIG. 5.
Figure 7:
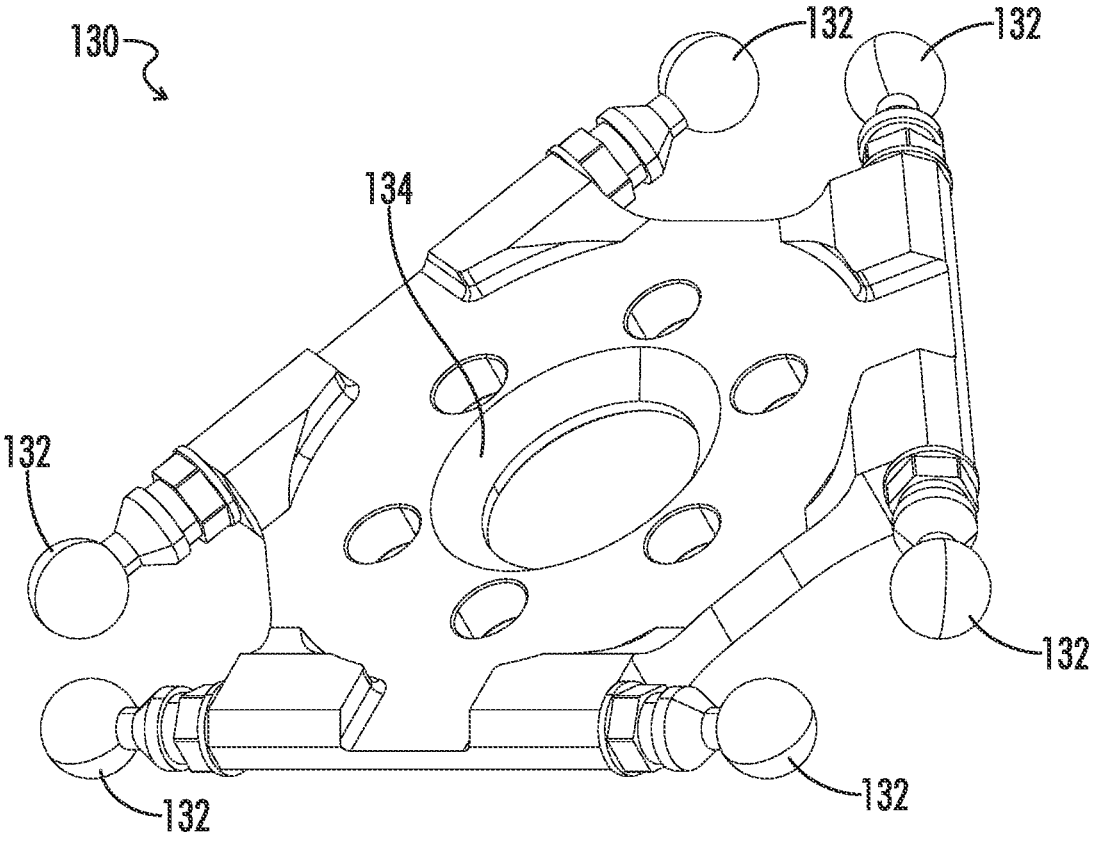
FIG. 7 is a perspective view of the movable mounting frame of the robot.

As illustrated in FIG. 6, the vacuum pump 280 is attached to shaft 220 and may rest on the mounting block 210 to define a fully extended position 282 of the shaft 220 and the end effector 230 away from the mounting block 210.

The robotic end effector apparatus 200 may further include an exhaust manifold 290 mounted on the vacuum pump 280. The exhaust manifold 290 may include an exhaust passage 292 having an exhaust inlet 293 communicated with the vacuum pump 280 and oriented concentric with the longitudinal axis 222 of the shaft 220. The exhaust manifold 290 may further include a flared exhaust outlet 294 projecting away from the vacuum pump and laterally away from the longitudinal axis 222. The pressurized air provided to air inlet 284 and the entrained air flowing up through the vacuum shaft 220 from the lower end 224 are exhausted out the flared exhaust outlet 294 and may carry therewith any small debris sucked up into the open lower end 224 of vacuum tube 220.

The exhaust manifold 290 may further include a reversing air passage 296 oriented substantially parallel to the longitudinal axis 222 for directing a jet of reversing air 286 in a direction opposite to a direction of flow of the suction 206 from the vacuum pump 280. The suction 206 may also be referred to herein as a suction air stream 206 or suction effect 206. As is further described below with reference to FIG. 20 the jet of reversing air 286 is used to blow off an article 150 which has been picked up with the end effector 230 when it is desired to release the article 150 from the end effector 230. The jet of reversing air 286 also serves to help clear the vacuum shaft 220 of any debris, such as for example plastic bags, that has been sucked up into the vacuum shaft 220.

Figure 10:
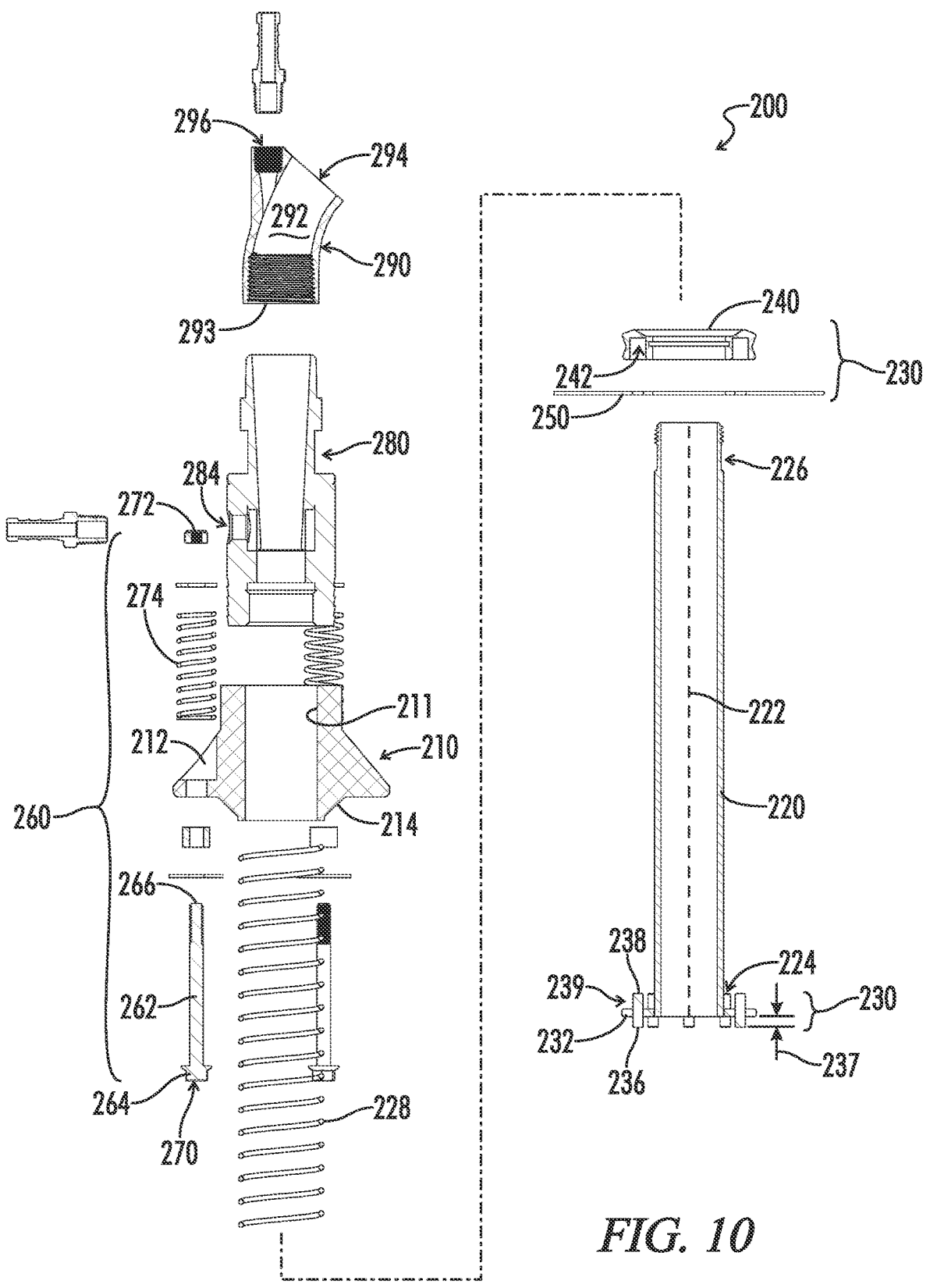
FIG. 10 is an exploded elevation sectioned view of the end effector apparatus of FIGS. 8 and 9.
Figure 11:
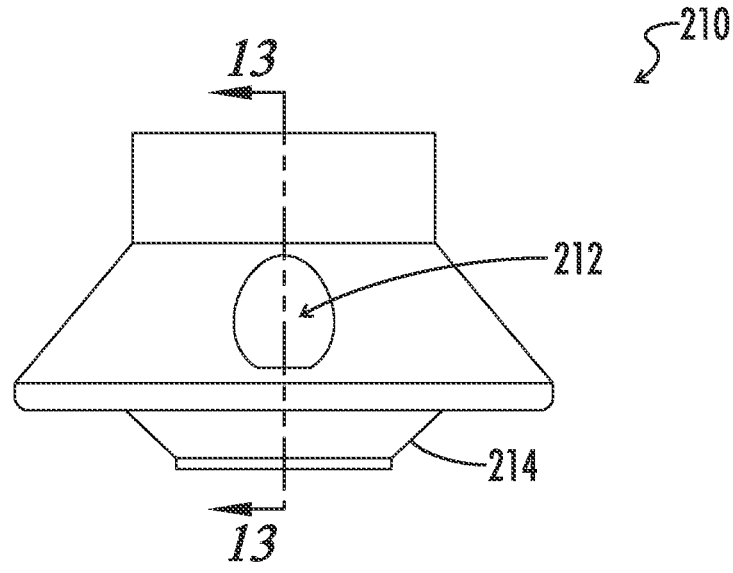
FIG. 11 is an elevation view of the sliding guide block of the end effector apparatus.
Figure 12:
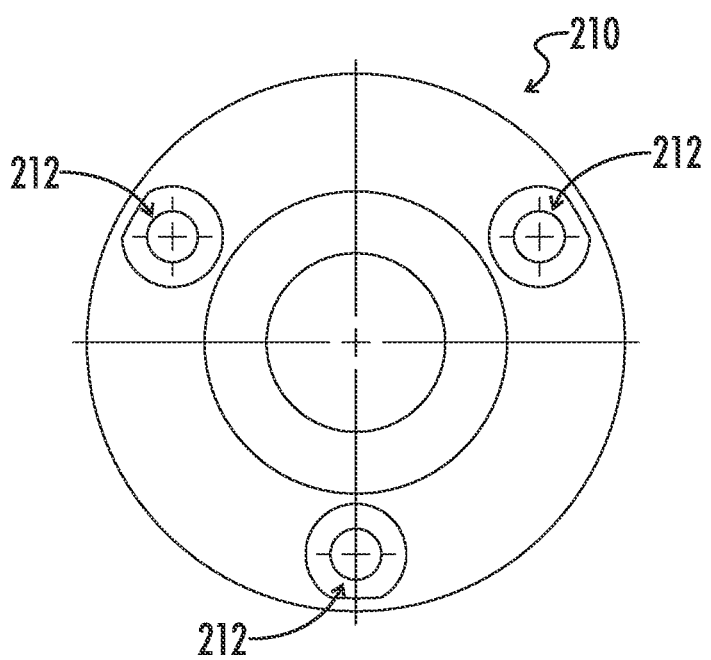
FIG. 12 is a top plan view of the sliding guide block of FIG. 11.
Figure 13:
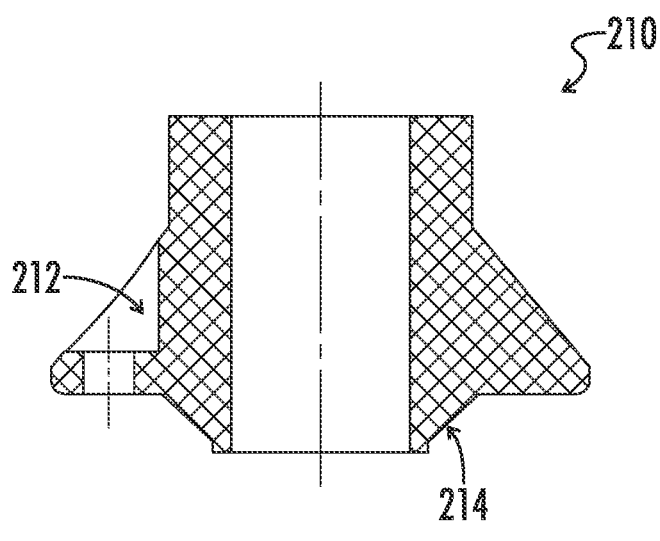
FIG. 13 is an elevation section view of the sliding guide block taken along line 13-13 of FIG. 12.
Figure 14:
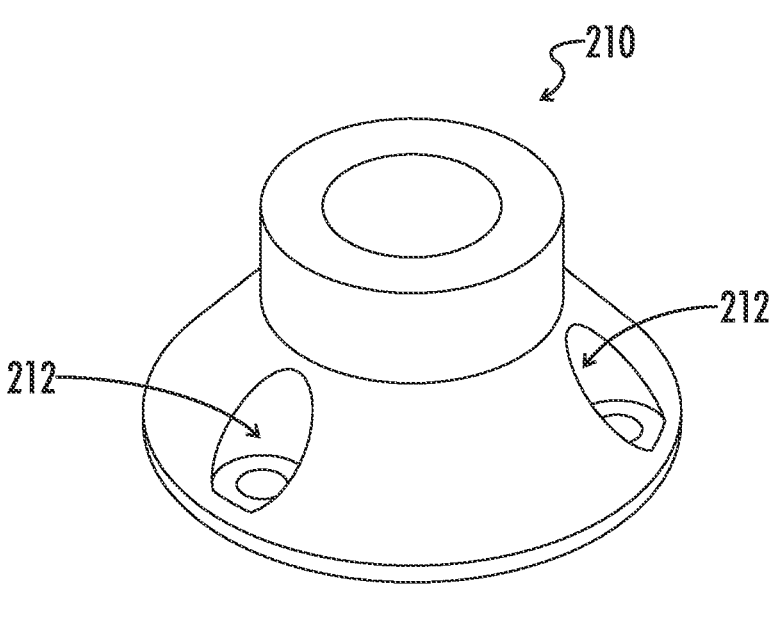
FIG. 14 is a perspective view of the sliding guide block.

As illustrated in FIGS. 6, 9 and 10, the end effector 230 may include a mounting flange 232, a clamping ring 240, and a flexible sheet 250. The flexible sheet 250 may also be referred to herein as a flexible gripper sheet 250 or a replacement flexible gripper sheet 250. The mounting flange 232 may be fixed to the shaft 220 adjacent to the lower end 224 of the shaft 220. The clamping ring may be slidably received around the shaft 220 above the mounting flange. The shaft biasing spring 228 may bias the clamping ring 240 downward toward the mounting flange 232. The flexible sheet 250 may be configured to be removably mounted on the shaft 220, such as, for example, by being clamped between the clamping ring 240 and the mounting flange 232 using the shaft biasing spring 228. The flexible sheet 250 may be configured to extend radially outward beyond the mounting flange 232 by at least 1.0 inch around an entire periphery of the mounting flange 232 when the flexible sheet 250 is positioned between the clamping ring 240 and the mounting flange 232.

The flexible sheet 250 may include a center opening 252 which may be smaller than the mounting flange 232 in a relaxed state 251 of the flexible sheet 250. The flexible sheet 250 maybe stretchable so that the flexible sheet 250 can be pulled upward over the mounting flange 232, such as, for example, when initially installed or replaced. The flexible sheet 250 may comprise a sheet of elastomeric material, such as, for example, being selected from the group consisting of polyurethane, fabric reinforced EDPM rubber, or any other suitable flexible and/or reinforced sheet material.

The shaft 220 may be cylindrical and may include a shaft outer diameter 221. The shaft outer diameter 221 may also be referred to herein as a suction tube outer diameter 221. The mounting flange 232 may be circular and may include a mounting flange outer diameter 234. The center opening 252 of the flexible sheet 250 may be a circular center opening having an opening diameter 254 larger than the shaft outer diameter 221 and smaller than the mounting flange outer diameter 234 in the relaxed state 251 of the flexible sheet 250.

Figure 16:
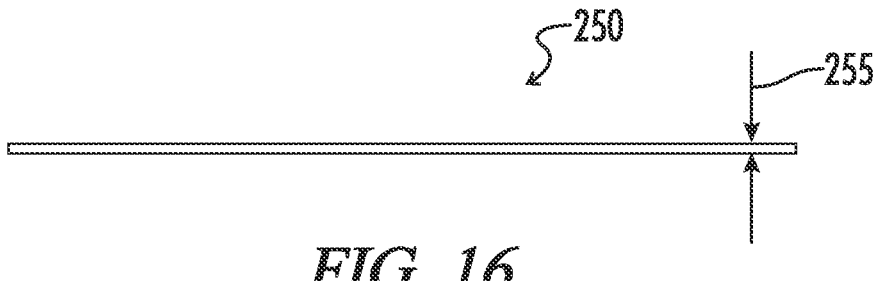
FIG. 16 is a side elevation view of the flexible sheet end effector of FIG. 15.

The mounting flange outer diameter 234 may be in a range from about 2.0 inches to about 3.0 inches. The flexible sheet 250 may include a circular outer periphery having a sheet outside diameter 256 in a range from about 4.0 inches to about 6.0 inches. The sheet outside diameter 256 may also be referred to herein as a circular outer periphery diameter 256. In an embodiment the flexible sheet 250 may have a non-circular outer periphery; for example, a square or an elliptical outer periphery. In an embodiment the outside diameter or other width-wise dimension of the flexible sheet may be greater than 6.0 inches. As illustrated in FIG. 16, the flexible sheet 250 may include a thickness 255 in a range from about 0.03 inch to 0.20 inch. In an embodiment the thickness 255 may be in a range of from about 0.03 inch to about 0.10 inch.

The robotic end effector apparatus 200, or more specifically, the end effector 230, may further include a plurality of projections 236 extending downward from the mounting flange 232. The plurality of projections 236 may be distributed around the lower end 224 of the shaft 220. The plurality of projections 236 may also be referred to herein as a plurality of supporting projections 236. The plurality of projections 236 may extend below the lower end 224 of the shaft 220 by a projecting distance 237 in a range from about 0.1 inch to about 0.5 inch, and more preferably in a range of from about 0.1 inch to about 0.3 inch. The plurality of projections 236 may be configured to reduce any potential blockage which may be caused by an article 150 being grasped by the robotic end effector apparatus 200. When the end effector 230 is lowered into engagement with an article 150 to be picked up the projections 236 will hold the radially inner portions of the flexible sheet 250 slightly away from the article 150 allowing the low pressure within the vacuum tube 220 to be communicated to the surrounding portions of the lower side of the flexible sheet 250. The flexible sheet will deform and conform to the surface of the article 150 being lifted, such as shown in FIG. 25. As seen in FIG. 25 the deformation of the flexible sheet may be both downwardly and upwardly depending upon the shape of the article being gripped. In the absence of such projections 236 the open lower end 224 of the suction tube 220 would sometimes be blocked by the article 150 to be lifted, thus preventing effective gripping by the flexible sheet 250 across much of its area.

Figure 15:
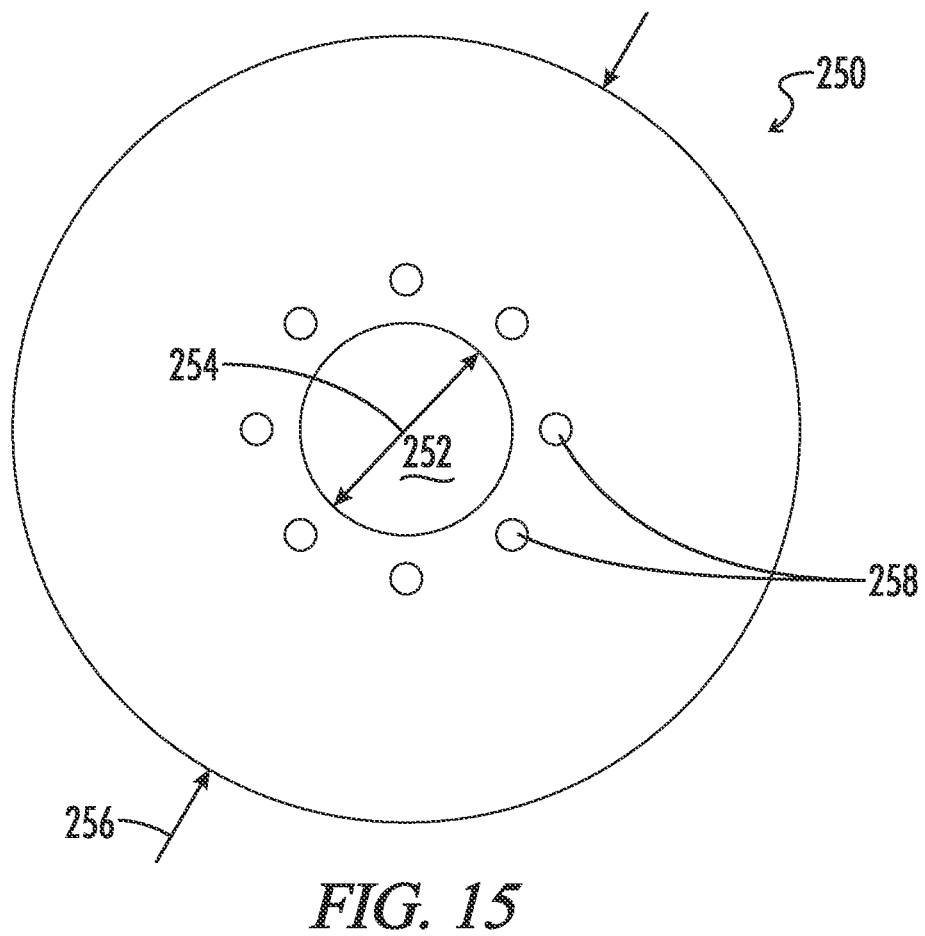
FIG. 15 is a top plan view of a flexible sheet end effector of the end effector apparatus.

The robotic end effector apparatus 200, or more specifically, the end effector 230, may further include plurality of mounting pins 238 extending upwardly from the mounting flange 232 and distributed around the shaft 220. As illustrated in FIG. 15, the flexible sheet 250 may include a plurality of mounting holes 258 distributed in a pattern corresponding to the plurality of mounting pins 238. The plurality of mounting holes 258 may be configured such that when the flexible sheet 250 is received on top of the mounting flange 232, the mounting pins 238 are received through the mounting holes 258. Each of the plurality of projections 236 and a corresponding one of the plurality of mounting pins 238 may be formed as opposite ends of a dowel pin 239. Each of the dowel pins 239 may extend through the mounting flange 232 to define the plurality of projections 236 and the plurality of mounting pins 238.

Figure 17:
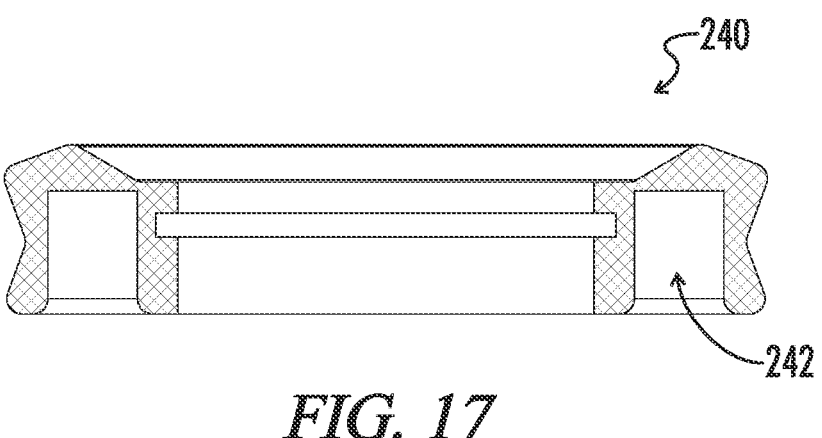
FIG. 17 is an elevation section view of a clamping ring of the end effector apparatus.
Figure 18:
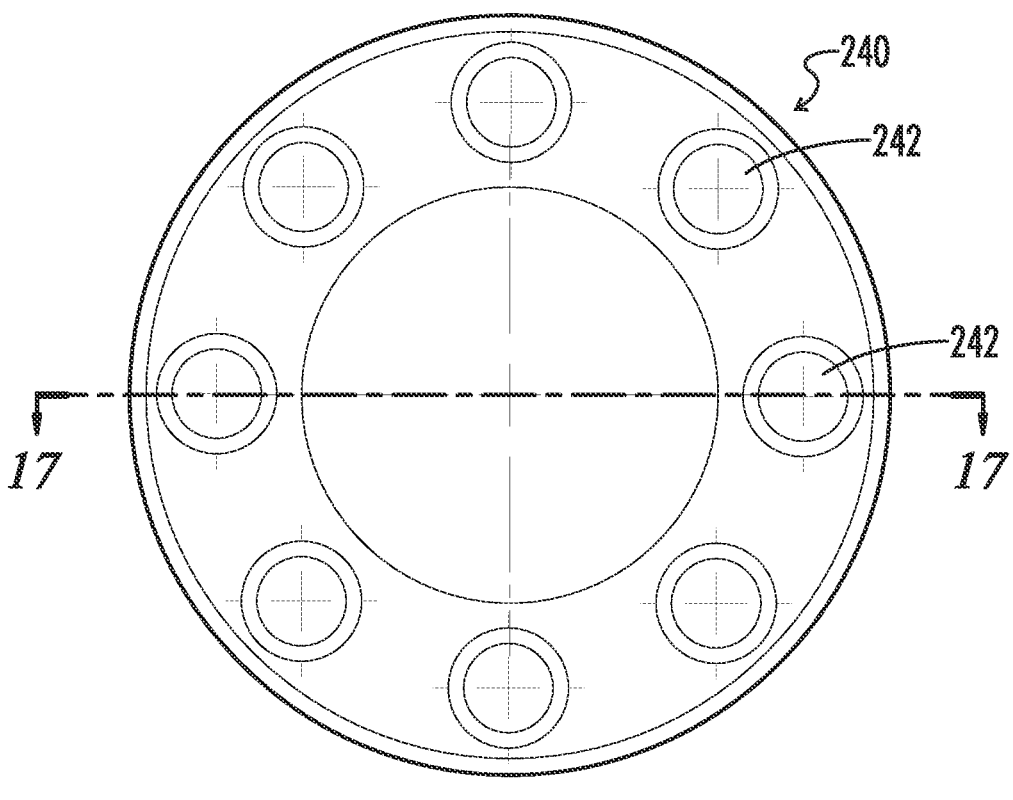
FIG. 18 is a bottom view of the clamping ring of FIG. 17.

Referring to FIGS. 17 and 18, the clamping ring 240 may include a plurality of receptacles 242 configured to receive the plurality of mounting pins 238. The plurality of receptacles 242 may be distributed in a pattern corresponding to the plurality of mounting pins 238 of the mounting flange 232 and/or the plurality of mounting holes 258 of the flexible sheet 250.

The flexible sheet 250 may be dimensioned and constructed such that when the shaft 220 is vertically oriented (e.g., positioned in the first orientation 202) and no suction is being applied to the lower end 224 of the shaft 220, the flexible sheet 250 remains substantially horizontal such that the flexible sheet 250 does not droop downward below the plurality of projections 236. The flexible sheet 250 may further be configured such that when the flexible sheet 250 is engaged with an article 150 to be grasped and suction 206 is being applied to the shaft 220, the flexible sheet 250 is deformable to engage the article 150.

Figures 26, 27:
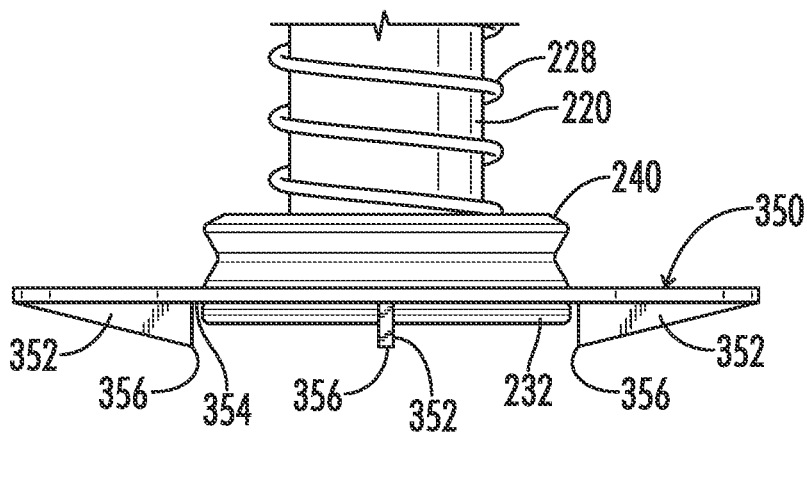
FIG. 26 is a schematic elevation view showing an alternative embodiment wherein the flexible gripper sheet has projections formed on its lower surface.
FIG. 27 is a perspective view of the lower side of the gripper sheet of FIG. 26.

In an alternative embodiment schematically shown in FIGS. 26 and 27 instead of having projections 236 extending downwardly from the mounting flange 232, the flexible sheet may be constructed to incorporate downward projections. In this embodiment a flexible sheet 350 may include a plurality of projections 352 extending downwardly from a planar lower surface 354 of the flexible sheet 350. The projections 352 may be in the form of rib like projections extending generally radially and being triangular in elevation shape so that a downwardmost part of each projection 352 is defined by a downward directed corner 356 of the projection 352. Other shapes of projections 352, such as rounded nubs or any suitable shape projection may be used. The projections 352 may be circumferentially spaced around the open lower end of the vacuum tube so as to aid in communicating low pressure within the vacuum tube to the radially outer portions of the flexible sheet 350. The projections 352 may extend downward below the open lower end of the vacuum tube. The flexible sheet 350 is shown without any mounting holes, but it may include mounting holes like the holes 258 shown in FIG. 15.

Figure 19:
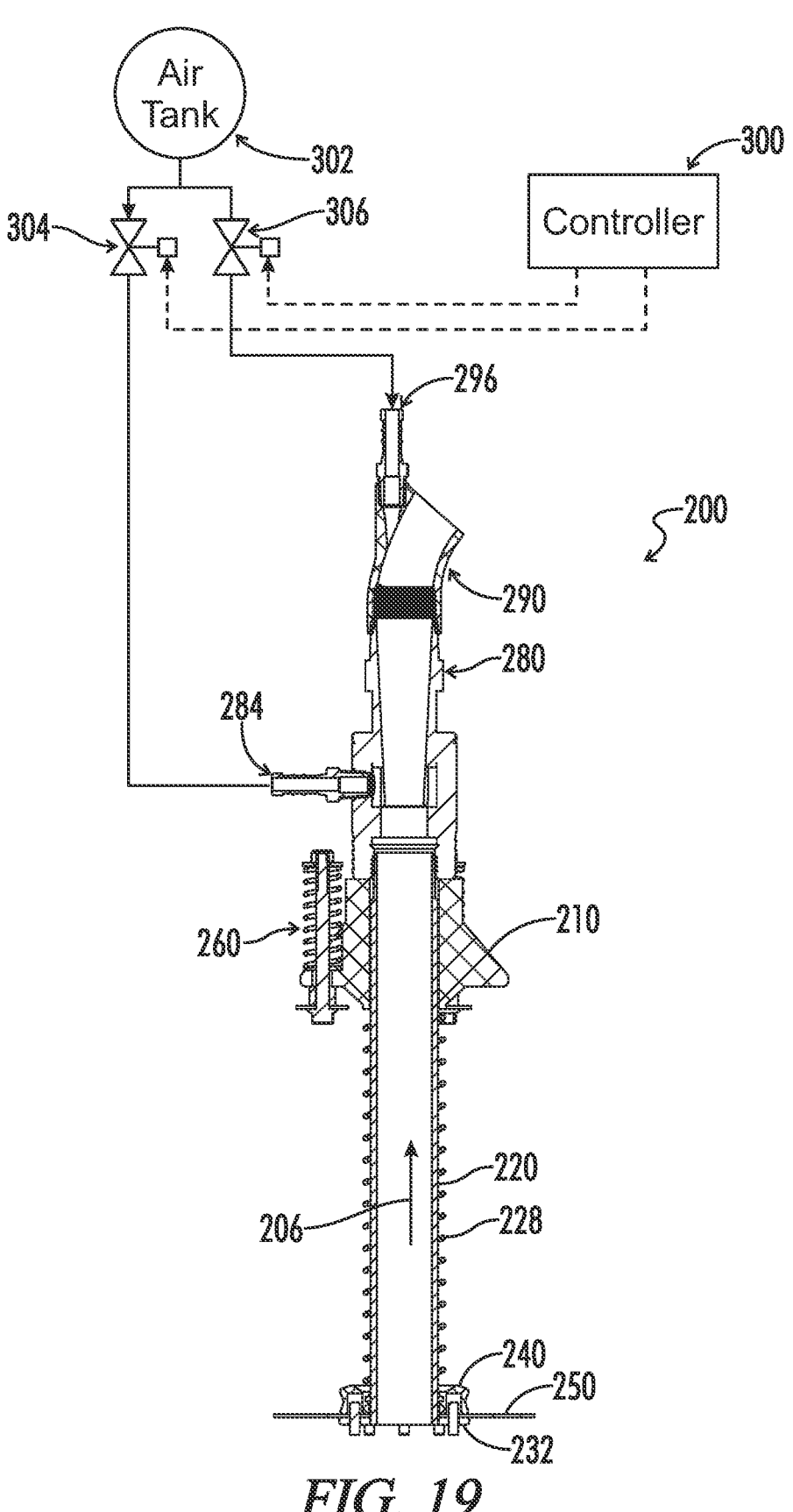
FIG. 19 is a schematic pneumatic and control diagram showing the air supply to the end effector apparatus.

Referring to FIG. 19, the robotic end effector apparatus 200 is schematically shown in combination with a controller 300 and an air tank 302. The controller 300 may be operatively configured to control a valve 304 coupled between the air tank 302 and the pressurized air inlet passage 284 of the vacuum pump 280. The controller 300 may further be operatively configured to control a valve 306 coupled between the air tank 302 and the reversing air passage 296 of the exhaust manifold 290. The control valves 304 and 306 may for example be solenoid operated 3-way spool valves. When it is desired to create a vacuum at the end effector 230 to pick up an article 150, pressurized air is directed from air tank 302 via control valve 304 to pressurized air inlet 284 of the vacuum pump 280. Using a venturi effect and/or a Coanda effect the vacuum pump 280 creates a low pressure zone within the vacuum tube 220 which causes atmospheric air to flow into the open lower end 224 of vacuum tube 220. If the flexible sheet 250 is closely adjacent an article 150 the sheet 250 will deform to conform to the surface of the article 150 and the suction or low pressure zone adjacent the open lower end 224 of suction tube 220 will cause the article 150 to be held against the flexible sheet 250 and the article 150 can be lifted and moved to another location where it is to be discharged. When it is desired to discharge or drop the article 150, in addition to terminating the suction force by terminating the flow of pressurized air to air inlet 284 of vacuum pump 280, a positive downward flow of pressurized air may be created by opening control valve 306 to inject a downward jet of pressurized air into inlet 296 to blow the article 150 off the end 224 of vacuum tube 220.

The terms "controller," "control circuit" and "control circuitry" as used herein may refer to, be embodied by or otherwise included within a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed and programmed to perform or cause the performance of the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

Figure 20:
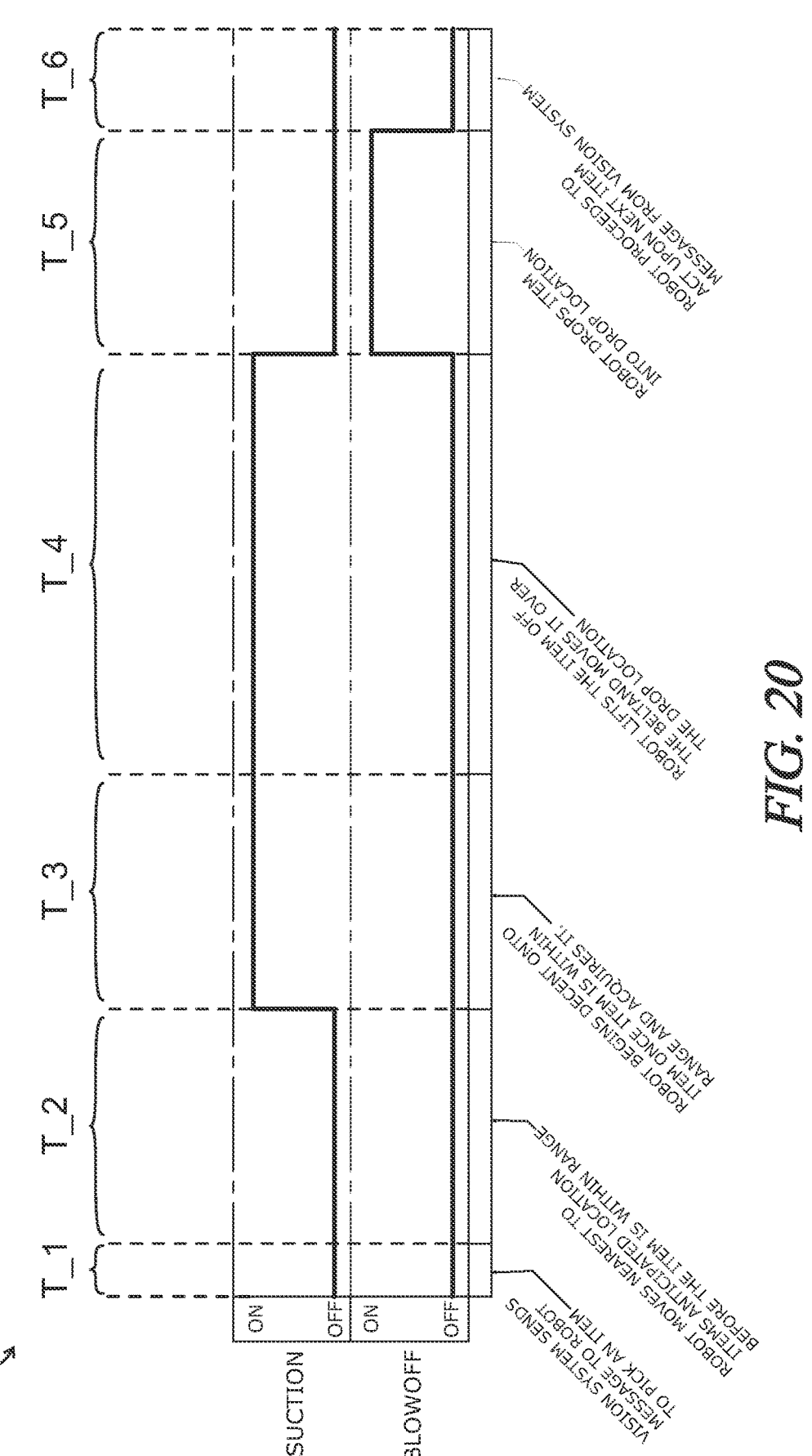
FIG. 20 is a schematic timing diagram showing the application of air to the vacuum pump and to the blow off nozzle of the end effector apparatus.

Referring to FIG. 20, a control diagram 400 corresponds to control signals from the controller 300. A first time interval T_1 of the control diagram 400 may correspond to a vision system (e.g., the system which identifies the article 150 to be picked up) sending a message to the robot 100 to pick an article 150 up. During the first time interval T_1, both the suction and the blowoff may be off.

A second time interval T_2 of the control diagram 400 may correspond to the robot 100 moving nearest to the article 150's anticipated location before the article 150 is within range. During the second time interval T_2, both the suction and the blowoff may be off.

A third time interval T_3 of the control diagram 400 may correspond to the robot 100 beginning its decent onto the article 150 once the article 150 is within range and acquiring the article 150. During the third time interval T_3, the suction may be on and the blowoff may be off.

A fourth time interval T_4 of the control diagram 400 may correspond to the robot 100 lifting the article 150 off of the conveyor belt and moving the article 150 over a drop location. During the fourth time interval T_4, the suction may be on and the blowoff may be off.

A fifth time interval T_5 of the control diagram 400 may correspond to the robot 100 dropping the article 150 into the drop location. During the fifth interval T_5 of the control diagram 400, the suction may be off and the blowoff may be on.

A sixth time interval T_6 of the control diagram 400 may correspond to the robot 100 proceeding to act upon a next article 150 based on a message from the vision system. During the sixth interval T_6, both the suction and the blowoff may be off.

Referring to FIG. 21, a method 500 of engaging a robotic end effector apparatus 200 with an article 150 to be picked up by the robotic end effector apparatus 200. The method 500 may include step (a) mounting 502 the robotic end effector apparatus 200 on a movable mounting frame 130 of a robot 100 so that the robotic end effector apparatus 200 is resiliently biased toward the article 150 by the spring 228 which may be referred to as a first spring. The method 500 may further include step (b) moving 504 the movable mounting frame 130 and the robotic end effector apparatus 200 along a longitudinal axis 222 toward the article 150 and engaging the robotic end effector apparatus 200 with the article 150. The method 500 may further include step (c) resiliently displacing 506 the robotic end effector apparatus 200 along the longitudinal axis 222 and against a biasing force of the first spring 228 toward the movable mounting frame 130 in response to a longitudinal force between the robotic end effector apparatus 200 and the article 150 upon engagement of the robotic end effector apparatus 200 with the article 150. The method 500 may further include step (d) resiliently displacing 508 the robotic end effector apparatus 200 against a biasing force of one or more of the springs 274, which may be referred to as a second spring, laterally relative to the longitudinal axis 222 in response to a lateral force between the robotic end effector apparatus 200 and the article 150 upon engagement of the robotic end effector apparatus 200 with the article 150. After step (d) the movable mounting frame and the robotic end effector apparatus 200 may be raised and the longitudinal axis of the robotic end effector apparatus may be returned to the first orientation relative to the movable mounting frame by action of the second biasing force of the second spring 274. This returning action may be in part accomplished by engaging the centering projection 214 of the robotic end effector apparatus with the centering receptacle 134 of the movable mounting frame.

Referring to FIG. 22, a flow chart is shown for a method 600 of replacing a flexible sheet 250 of a robotic end effector apparatus 200 for grasping an article 150 using suction 206. The method 600 may include step (a) moving 602 a clamping ring 240 upward against a downward biasing force of a shaft biasing spring 228 to release the flexible sheet 250 from a clamped engagement between the clamping ring 240 and a mounting flange 232. The method 600 may further include step (b) stretching 604 the center opening 252 of the flexible sheet 250 downward over the mounting flange 232 to remove the flexible sheet 250 from the robotic end effector apparatus 200. The method 600 may further include step (c) stretching 606 a center opening 252 of a replacement flexible gripper sheet 250 upward over the mounting flange 232. The method 600 may further include step (d) clamping 608 the replacement flexible gripper sheet 250 between the clamping ring 240 and the mounting flange 232.

The method 600 may further comprise engaging an article 150 being grasped by the replacement flexible gripper sheet 250 with the plurality of projections 236 extending downward below the replacement flexible gripper sheet 250 and thereby reducing blockage of the lower end 224 of the shaft 220 of the robotic end effector apparatus 200 by the article 150 being grasped by the replacement flexible gripper sheet 250.

The method 600 may further comprise, prior to the engaging step, maintaining the replacement flexible gripper sheet 250 substantially horizontal such that the flexible sheet 250 does not droop downward below the plurality of projections 236. Furthermore, the engaging step may further include deforming the replacement flexible gripper sheet 250 to engage the article 150 to be grasped when suction 206 is being applied to the lower end 224 of the robotic end effector apparatus 200 and the plurality of projections 236 engage the article 150.

Thus, it is seen that the apparatus and methods of the present invention readily achieve the ends and advantages mentioned as well as those inherent therein. While certain preferred embodiments of the present invention have been illustrated and described for purposes of the present disclosure, numerous changes in the arrangement and construction of parts and steps may be made by those skilled in the art which changes are encompassed within the scope and spirit of the present invention as defined by the appended claims.

What is claimed is:

1. A robotic end effector apparatus for grasping an article, comprising:

a movable mounting frame of a robot;

a mounting block received on the movable mounting frame of the robot;

a shaft extending from the mounting block, the shaft having a longitudinal axis;

an end effector mounted on a lower end of the shaft for engaging an article to be grasped; and a plurality of spring biased mounting fasteners configured to connect the mounting block to the movable mounting frame of the robot such that in the absence of a lateral deflecting force being applied to the end effector the mounting block is held resiliently against the movable mounting frame of the robot and the longitudinal axis is held in a first orientation, and such that when a lateral deflecting force is applied to the end effector the lower end of the shaft can deflect laterally such that the longitudinal axis is skewed from the first orientation.

2. The apparatus of claim 1, wherein the plurality of spring biased mounting fasteners includes three spring biased mounting fasteners arranged substantially equidistant around the longitudinal axis.

3. The apparatus of claim 1, wherein:

each of the plurality of spring biased mounting fasteners includes an elongated fastener shaft, a first stop attached to one end of the fastener shaft and configured to engage the movable mounting frame of the robot, a second stop attached to a second end of the fastener shaft, and a fastener biasing spring configured to be disposed between the second stop and the mounting block to bias the mounting block against the movable mounting frame of the robot.

4. The apparatus of claim 3, wherein the mounting block has a plurality of cylindrical recesses formed therein for receiving ends of the fastener biasing springs.

5. The apparatus of claim 1, wherein the plurality of spring biased mounting fasteners are configured to permit a skew angle of the shaft up to at least 10 degrees.

6. The apparatus of claim 1, wherein the plurality of spring biased mounting fasteners are configured to permit a skew angle of the shaft up to at least 15 degrees.

7. The apparatus of claim 1, wherein:

the mounting block includes a tapered centering projection extending toward the end effector.

8. The apparatus of claim 7, wherein:

the tapered centering projection is a conically tapered centering projection surrounding the shaft.

9. The apparatus of claim 7 in combination with the movable mounting frame of the robot, wherein:

the movable mounting frame of the robot includes a tapered centering receptacle; and the tapered centering projection is received in the tapered centering receptacle to define the first orientation of the longitudinal axis when the mounting block is held resiliently against the movable mounting frame of the robot by the plurality of spring biased mounting fasteners.

10. The apparatus of claim 1, wherein:

the shaft is slidably received in the mounting block so that upon impacting an article with the end effector, the end effector and the shaft can move along the longitudinal axis toward the mounting block.

11. The apparatus of claim 10, further comprising:

a shaft biasing spring disposed between the mounting block and the end effector for biasing the shaft and the end effector away from the mounting block.

12. The apparatus of claim 1, wherein:

the shaft is a tubular shaft configured to communication a suction to the end effector.

13. The apparatus of claim 12, further comprising:

a vacuum pump mounted on the tubular shaft on a portion of the tubular shaft on an opposite side of the mounting block from the end effector.

14. The apparatus of claim 13, wherein:

the tubular shaft is slidably received in the mounting block so that upon impacting an article with the end effector, the end effector and the tubular shaft can move along the longitudinal axis toward the mounting block;

the apparatus further includes a shaft biasing spring disposed between the mounting block and the end effector for biasing the tubular shaft and the end effector away from the mounting block; and the vacuum pump rests on the mounting block to define a fully extended position of the tubular shaft and the end effector away from the mounting block.

15. The apparatus of claim 14, further comprising:

an exhaust manifold mounted on the vacuum pump and having an exhaust passage including an exhaust inlet communicated with the vacuum pump and oriented concentric with the longitudinal axis of the tubular shaft, the exhaust manifold further including a flared exhaust outlet projecting away from the vacuum pump and laterally away from the longitudinal axis.

16. The apparatus of claim 15, wherein:

the exhaust manifold further includes a reversing air passage oriented substantially parallel to the longitudinal axis for directing a jet of reversing air into the exhaust manifold in a direction opposite to a direction of flow of a suction air stream from the vacuum pump.

17. A method of engaging a robotic end effector apparatus with an article to be picked by the robotic end effector apparatus, the method comprising:

(a) mounting the end effector apparatus on a movable mounting frame of a robot so that the robotic end effector apparatus is resiliently biased by a first spring toward the article and so that a longitudinal axis of the robotic end effector apparatus has a first orientation relative to the movable mounting frame;

(b) moving the movable mounting frame and the robotic end effector apparatus along the longitudinal axis toward the article and engaging the robotic end effector apparatus with the article;

(c) resiliently displacing the robotic end effector apparatus along the longitudinal axis against a biasing force of the first spring and toward the movable mounting frame in response to a longitudinal force between the robotic end effector apparatus and the article upon engagement of the robotic end effector apparatus with the article; and (d) resiliently displacing the robotic end effector apparatus laterally relative to the longitudinal axis against a second biasing force of a second spring in response to a lateral force between the robotic end effector apparatus and the article upon engagement of the robotic end effector apparatus with the article.

18. The method of claim 17, further comprising:

after step (d), raising the movably mounting frame and the robotic end effector apparatus; and returning the longitudinal axis of the robotic end effector apparatus to the first orientation relative to the movable mounting frame by the second biasing force of the second spring.

19. The method of claim 18, further comprising:

engaging a centering projection of the robotic end effector apparatus with a centering receptacle of the movable mounting frame.

* * * * *